US008312389B2

(12) United States Patent
Crawford et al.

(10) Patent No.: US 8,312,389 B2
(45) Date of Patent: Nov. 13, 2012

(54) VISUALIZATION OF DECISION LOGIC

(75) Inventors: Stuart L. Crawford, Piedmont, CA (US); Gaurav Chhaparwal, Rajasthan (IN); Navin Doshi, Karnataka (IN); Kashyap Babu Rao Kolipaka, Karnataka (IN); Sergei Tolmanov, Walnut Creed, CA (US); Michael Steele, Michigan City, IN (US); Megan Thorsen, Sunnyvale, CA (US)

(73) Assignee: Fair Isaac Corporation, Minneapolis, MN (US)

( * ) Notice: Subject to any disclaimer, the term of this patent is extended or adjusted under 35 U.S.C. 154(b) by 1049 days.

(21) Appl. No.: 12/201,400

(22) Filed: Aug. 29, 2008

(65) Prior Publication Data

US 2009/0064053 A1 Mar. 5, 2009

(30) Foreign Application Priority Data

Aug. 31, 2007 (IN) .......................... 1845/DEL/2007

(51) Int. Cl.
*G06F 3/00* (2006.01)
*G06F 9/00* (2006.01)
*G06F 17/00* (2006.01)

(52) U.S. Cl. ......... 715/854; 715/853; 715/969; 715/763

(58) Field of Classification Search .................. 715/762, 715/763, 764, 765, 766, 767, 768, 853, 854, 715/855, 969
See application file for complete search history.

(56) References Cited

U.S. PATENT DOCUMENTS

| | | | |
|---|---|---|---|
| 5,515,487 A * | 5/1996 | Beaudet et al. ............... | 345/440 |
| 5,528,735 A | 6/1996 | Strasnick et al. | |
| 5,537,630 A | 7/1996 | Berry et al. | |
| 5,546,529 A | 8/1996 | Bowers et al. | |
| 5,603,025 A | 2/1997 | Tabb et al. | |
| 5,608,898 A | 3/1997 | Turpin et al. | |
| 5,623,541 A | 4/1997 | Boyle et al. | |
| 5,644,686 A | 7/1997 | Hekmatpour | |
| 5,682,487 A | 10/1997 | Thomson | |

(Continued)

FOREIGN PATENT DOCUMENTS

EP 0690367 1/1996

(Continued)

OTHER PUBLICATIONS

Fekete et al. "Excentric Labling: Dynamic Neighborhood Labeling for Data Visualization," ACM 1999.

(Continued)

*Primary Examiner* — Kieu Vu
*Assistant Examiner* — Anita D Chaudhuri
(74) *Attorney, Agent, or Firm* — Mintz, Levin, Cohn, Ferris, Glovsky and Popeo, P.C.

(57) ABSTRACT

Techniques for visualization of decision logic are provided. In one aspect, the techniques can be implemented by providing a control within a graphical user interface to a user. The control can display a plurality of graphical user interface elements corresponding to linked nodes within a hierarchical structure. An input identifying a selected graphical user interface element within the control can be generated by a user. A selected node within the hierarchical structure can be identified based on the selected graphical user interface element. In response to a request from a user, modifying an appearance of a subset of the linked nodes within the hierarchical structure based on a desired visualization criteria, the linked nodes within the hierarchical structure and the selected node.

38 Claims, 18 Drawing Sheets

U.S. PATENT DOCUMENTS

| | | | |
|---|---|---|---|
| 5,692,107 A | 11/1997 | Simoudis et al. | |
| 5,696,885 A | 12/1997 | Hekmatpour | |
| 5,701,137 A | 12/1997 | Kiernan et al. | |
| 5,701,400 A | 12/1997 | Amado | |
| 5,710,896 A | 1/1998 | Seidl | |
| 5,720,007 A | 2/1998 | Hekmatpour | |
| 5,742,836 A | 4/1998 | Turpin et al. | |
| 5,745,712 A | 4/1998 | Turpin et al. | |
| 5,787,416 A | 7/1998 | Tabb et al. | |
| 5,796,932 A | 8/1998 | Fox et al. | |
| 5,806,056 A | 9/1998 | Hekmatpour | |
| 5,815,415 A | 9/1998 | Bentley et al. | |
| 5,818,155 A | 10/1998 | Kawamura et al. | |
| 5,822,745 A | 10/1998 | Hekmatpour | |
| 5,870,559 A | 2/1999 | Lesham et al. | |
| 5,870,768 A | 2/1999 | Hekmatpour | |
| 5,875,431 A | 2/1999 | Heckman et al. | |
| 5,890,131 A | 3/1999 | Ebert et al. | |
| 5,917,492 A | 6/1999 | Bereiter et al. | |
| 5,920,873 A | 7/1999 | Van Huben et al. | |
| 5,930,764 A | 7/1999 | Melchione et al. | |
| 5,953,017 A | 9/1999 | Beach et al. | |
| 5,953,707 A | 9/1999 | Huang et al. | |
| 5,958,008 A | 9/1999 | Pogrebisky et al. | |
| 5,966,126 A | 10/1999 | Szabo | |
| 5,966,695 A | 10/1999 | Melchione et al. | |
| 5,974,127 A | 10/1999 | Wernli et al. | |
| 5,982,370 A | 11/1999 | Kamper | |
| 5,987,242 A | 11/1999 | Bentley et al. | |
| 5,999,192 A * | 12/1999 | Selfridge et al. | 345/440 |
| 6,014,138 A | 1/2000 | Cain et al. | |
| 6,073,138 A | 6/2000 | de l'Etraz et al. | |
| 6,078,324 A | 6/2000 | Phathayakorn et al. | |
| 6,088,693 A | 7/2000 | Van Huben et al. | |
| 6,089,453 A | 7/2000 | Kayser et al. | |
| 6,094,654 A | 7/2000 | Van Huben et al. | |
| 6,108,004 A | 8/2000 | Medi | |
| 6,111,578 A | 8/2000 | Tesler | |
| 6,112,202 A | 8/2000 | Kleinberq | |
| 6,134,706 A | 10/2000 | Carey et al. | |
| 6,137,499 A | 10/2000 | Tesler | |
| 6,237,499 B1 | 5/2001 | McKoy | |
| 6,249,768 B1 | 6/2001 | Tulskie, Jr. et al. | |
| 6,259,451 B1 * | 7/2001 | Tesler | 345/419 |
| 6,285,366 B1 | 9/2001 | Ng et al. | |
| 6,292,830 B1 | 9/2001 | Taylor et al. | |
| 6,327,551 B1 | 12/2001 | Peterson et al. | |
| 6,377,259 B1 * | 4/2002 | Tenev et al. | 345/440 |
| 6,396,488 B1 | 5/2002 | Simmons et al. | |
| 6,411,936 B1 | 6/2002 | Sanders | |
| 6,496,208 B1 * | 12/2002 | Bernhardt et al. | 715/853 |
| 6,556,983 B1 * | 4/2003 | Altschuler et al. | 706/55 |
| 6,609,098 B1 * | 8/2003 | DeMarcken | 705/6 |
| 6,646,652 B2 | 11/2003 | Card et al. | |
| 6,738,736 B1 | 5/2004 | Bond | |
| 6,897,885 B1 * | 5/2005 | Hao et al. | 715/853 |
| 7,171,407 B2 * | 1/2007 | Barton et al. | 1/1 |
| 7,171,618 B2 * | 1/2007 | Harrington et al. | 715/229 |
| 7,257,588 B2 * | 8/2007 | Keith, Jr. | 1/1 |
| 7,346,529 B2 | 3/2008 | Flores | |
| 7,831,526 B1 | 11/2010 | Crawford et al. | |
| 2001/0049846 A1 | 12/2001 | Guzzi et al. | |
| 2002/0147626 A1 | 10/2002 | Zagotta et al. | |
| 2003/0069869 A1 | 4/2003 | Gronau et al. | |
| 2004/0039619 A1 | 2/2004 | Zarb | |
| 2004/0073442 A1 | 4/2004 | Heyns et al. | |
| 2004/0107131 A1 | 6/2004 | Wilkerson et al. | |
| 2004/0111255 A1 | 6/2004 | Huerta et al. | |
| 2006/0173753 A1 | 8/2006 | Padmanabhan et al. | |
| 2006/0188620 A1 | 8/2006 | Gutwein et al. | |
| 2008/0147584 A1 | 6/2008 | Buss | |

FOREIGN PATENT DOCUMENTS

| | | |
|---|---|---|
| EP | 0717346 | 6/1996 |
| EP | 0770967 | 5/1997 |
| EP | 0978989 | 2/2000 |
| WO | 93/20510 | 10/1993 |
| WO | 95/12161 | 5/1995 |
| WO | 97/21171 | 6/1997 |

OTHER PUBLICATIONS

Hightower et al. "Graphical Multiscale Web Histories: A Study of PadPrint".
Bederson et al. "A Zooming Web Browser".
Noik "Layout-Independent Fisheye Views of Nested Graphs".
Clark, J., "Customizing Common Controls" Sep. 1997: Dr. Dobbs Journal.
Coffee, Peter "SPSS More Than a Pretty Face" Feb. 1996 PC Week.
Furnas, George W., "Generalized Fisheye Views" 1986 Human Factors in Computing Systems CHI '86 Conference Proceedings.
Lamping, et al. "A Focus+Context Technique Based on Hyperbolic Geometry for Visualization Hierarchies" Xerox Palo Alto Research Center.
Kohavi, "Bottom Up Induction of Oblivious Read-Once Decision Graphs" European Conference on Machine Learning 1994.
Friedman et al. "Finding the Optimal Variable Ordering for Binary Decision Diagrams" ICCC Transactions on Computers, vol. 39, No. 5 May 1990.
Covaliu, Zvi, "Decision Analysis: Concepts, Tools and Promise" Fair Isaac White Paper.
Efron & Tibshirani, *An Introduction to the Bootstrap* (1993).
U.S. Appl. No. 11/845,291, filed Aug. 27, 2007, Crawford.
Pook, Stuart, et al. "Context and Interaction in Zoomable User Interfaces," (ACM Press) pp. 227-231 & 317, May 2000, Palermo, Italy.
Sarkar et al. "Graphical Fisheye View of Graphs," ACM 1992.
Bederson et al. "Pad++: A Zoomable Graphical Interface for Exploring Alternative Interface Physics," ACM 1994.
B. Gaines, "Transforming Rules and Trees into Comprehensible Knowledge Structures", Advances in Knowledge Discovery and Data Mining, 1996, pp. 1-18.

* cited by examiner

VISUALIZATION OF DECISION LOGIC

REFERENCE TO RELATED APPLICATION

This application claims priority under 35 USC §119 to Indian Patent Application No. 1845/DEL/2007, filed on Aug. 31, 2007, entitled: "Visualization of Decision Trees", the contents of which are hereby incorporated by reference.

BACKGROUND

Hierarchical structures composed of nodes and links can represent various decision logic. Decision logic can represent a series of decisions that divide a population into subsets. The decisions can be made on the basis of the values of one or more variables. Decision logic can be used to assign a single course of action (which could be to take no action at all) to each population subset. One example of decision logic is described in the U.S. Pat. No. 7,000,199, incorporated by reference hereto in its entirety.

Decision logic can be represented by decision tree, directed acyclic graph ("DAG") and exception-based directed acyclic graph ("EDAG") structures. Representations of decision logic can have leaf nodes (sometimes referred to as "action nodes"), a root node (sometimes referred to as a "start node") and nodes that appear between the end nodes and the root nodes (sometimes referred to as "condition nodes" or "intermediate nodes" or "split nodes"). Depending on the type of a structure representing the decision logic, the root nodes, leaf nodes and intermediate nodes can be treated differently. For example, a root node can represent the beginning of an evaluation process, the intermediate nodes can represent evaluation conditions tested on one or more variables, and the leaf nodes can represent actions that should be taken if all of the evaluation steps corresponding to the condition nodes leading to these action nodes have been successfully resolved.

Decision trees can represent each of the decisions of the decision logic in a form of a branch. Decision trees can have one and only one root (or start) node. The decisions can be represented by two or more links (also referred to as "arcs") coming out of a single node. Each branch can correspond to a set of conditions or checks that can be configured such that only one condition is true in all cases. If a condition resolves to true, a link associated with this condition can be followed further. That link can lead to either an action node (i.e., leaf node), or to another condition node. All nodes within a decision tree can have one and only one parent node.

Condition nodes of some decision trees have either a single arc to an action node or two or more arcs to condition nodes. Some decision trees can have two arcs coming out of a single condition node and leading to two action nodes. For example, two arcs coming out of a single condition node can be used to assign two actions to the two subpopulations represented by those two conditions. In some decision trees, the start node can be directly connected to a single action node. In this case, there are no branches or condition nodes at all.

Decision trees can be used for the graphical representation of complex decision logic, involving evaluations of hundreds of variables, leading to hundreds of possible outcomes. Such decision trees can require a large number of nodes that can be difficult to display and analyze.

Decision logic can also be represented by a "Directed Acyclic Graph", or DAG. A DAG structure has a set of nodes connected by links. The decision process starts at a single root node (also referred to as a "start node"). Some DAGs can have nodes that either have a single link to an action node, or two or more links to condition nodes. Each link can go towards a node that has links coming in from other nodes. Consequently, a node within a DAG structure can have more than one parent node. DAG structures do not allow links that introduce cycles in the graph. In some DAG structures, a condition node can have a single link to another condition node.

Generally, there are two kinds of DAG's: non-backtracking and backtracking. In non-backtracking DAG's, all nodes link to a single action node, or they link to 2 or more condition nodes where the conditions of those nodes are set up so that one of them must evaluate to true. In this way, every member of the population will eventually get assigned a single action without having to revisit an earlier node to explore additional possible paths to an action.

In a backtracking DAG, it is possible for condition nodes to link to a single condition node, or to link to multiple condition nodes where more than one of those conditions can evaluate to true. Backtracking DAGs allow backtracking to earlier nodes to explore other possible paths if a certain condition node does not evaluate to true. However, the conditions of the nodes must be set up so that there is a path to an action node for every possible case from the population.

For example, a DAG can be used to represent decision logic by associating each condition node to one of the decisions in the decision logic. If the condition at that node resolves to true, then the decision process can proceed down one of its arcs. The decision process will eventually reach an action node that identifies the action assigned to that subpopulation, or another condition node that represents the next decision. If the condition at a node is false, then the decision process backs up to one of the unexplored links coming out of a node that was previously visited. The node conditions and arcs of the DAG can be set up so that it is guaranteed that exactly one action node is reached in all circumstances. Some forms of DAG structures just have a start node with a link directly to an action node, without any condition nodes in between.

Decision logic can also be represented by an Exception Directed Acyclic Graph ("EDAG"). An EDAG structure is a set of nodes connected by links. In EDAG structures, the decision process starts at a single root node called an Exception node. The Exception node represents the action to assign unless it is possible to assign some other action by following links to one of the action nodes. In some EDAG structures, each node can have only one link going out to an action node, one link going to another exception node, or one or more links going to condition nodes.

EDAG structures allow each link to go towards a node that has links coming in from other nodes. In other words, EDAG nodes can have more than one parent node. EDAG structures, just like DAG structures do not support links that introduce cycles in the graph.

An EDAG can represent decision logic, for example, by associating each condition node to one of the decisions in the decision logic. If the condition at that node resolves to true, then the decision process can proceed down one of its arcs. The decision process can either reach an action node that identifies the action assigned to that subpopulation, or it can reach another condition node that represents the next decision. If the condition at a node resolves to false, then the decision process follows one of the unexplored arcs coming out of a node that was previously visited. In some EDAG structures, the decision process may never reach an action node. In other words, EDAG structures can support subpopulations that are not expressly assigned to any particular action node. In that case, the action represented by the most recently visited exception node can be assigned to these subpopulations. One form of an EDAG structure can be represented by a single exception node.

Decision tree, DAG and EDAG structures can be leveled. A leveled decision tree can represent a structure in which all condition nodes aligned along a single column or row correspond to decisions checking the value of a single, identical variable. Similarly, a leveled DAG is a DAG (and a leveled EDAG is an EDAG) where all condition nodes correspond to decisions using the value of a single variable, and all the condition nodes corresponding to the same variable are aligned along a single column or row. In addition, the conditions on nodes, and links between nodes, can be set up so that no link goes between nodes in the same level, nor does a link go from a node in a lower level to a node in a higher level. In some DAG structures, the root node can appear in its own column or row, and all the action nodes can appear in their own column or row. In some EDAG structures, the Exception node can appear in its own column or row, and all the action nodes can appear in their own column or row.

SUMMARY

A system and a method for visualization of decision logic are provided. In one aspect, the system and the method can be implemented by providing a control within a graphical user interface to a user. The control can display a plurality of graphical user interface elements corresponding to linked nodes within a hierarchical structure. An input identifying a selected graphical user interface element within the control can be generated by a user. A selected node within the hierarchical structure can be identified based on the selected graphical user interface element. A user can also generate a request for modifying an appearance of a subset of the linked nodes within the hierarchical structure based on a desired visualization criteria, the linked nodes within the hierarchical structure and the selected node. Based on the request, an appearance of one or more graphical user interface elements within the control can be modified.

In one implementation, the desired visualization criteria can comprise a relation criteria and a selection criteria. For example, the relation criteria can comprise at least one of the parents, children, ancestors, descendants and siblings. In another implementation, at least one of the linked nodes within the hierarchical structure can correspond to a condition variable and the relation criteria can correspond to the condition variable.

In one implementation, the selection criteria can comprise at least one of: color, fading and visibility. The selection criteria, in some implementations, can be based on a data from a data set. The hierarchical structure can be selected from the group consisting of DAG, EDAG, decision tree and action graph. The hierarchical structure can also be leveled. In some implementations, each level of the hierarchical structure can be displayed by the control using alternating background colors.

In another aspect, a method and a system can be implemented by providing a control within a graphical user interface to a user, the control comprising a plurality of graphical user interface elements corresponding to linked nodes within a hierarchical structure; receiving a user-generated request for modifying an appearance of a subset of the linked nodes within the hierarchical structure based on a selection criteria, the linked nodes within the hierarchical structure and a data from a dataset; and, modifying an appearance of one or more graphical user interface elements corresponding to the received request. For example, the selection criteria can comprise at least one of: color, fading and visibility. The hierarchical structure can be selected from the group consisting of DAG, EDAG, decision tree and action graph.

In some implementations, the data can correspond to frequency information. For example, the frequency information can represent the most executed paths. The frequency information can also represent the least executed paths. In some implementations, the dataset can be stored in at least one file or database. In some other implementations, the data can be generated, for example, as a result of a simulation.

In another aspect, a system and a method can be used to generate action graphs. In some implementations, an action graph can be a set of nodes connected by links. The action graph can visually describe the population subset that is assigned a particular action by the strategy. In some implementations, an action graph can have a single root node (or start node) and a single action node. Each node of the action graph can have either a single link going towards the action node, or one or more links going towards condition nodes. Each link can go towards a node that has links coming in from other nodes. In other words, nodes can have more than one parent node. Generally, action graphs may not support links that introduces cycles in the graph.

An action graph can represent a decision process to determine whether to assign the action represented by the action graph or not. For example, each condition node can correspond to one of the decisions in the decision logic. Beginning at the start node, each link can be followed to either an action node or a condition node. If a condition node is reached and the condition at that node is true, then one of the arcs associated with the condition node can be followed further down the hierarchy. If a condition node is reached and the condition at the node is false, then other links from previously visited nodes can be followed. If the action node is reached, then the action represented by this action graph can be assigned. If an action graph does not provide any paths to the action node such that all conditions associated with the condition nodes on that path are true, the action represented by this action graph is not assigned.

In yet another aspect a system and a method can be implemented by providing a control within a graphical user interface to a user, the control comprising a plurality of graphical user interface elements corresponding to linked nodes within a hierarchical structure, the hierarchical structure comprising at least one root node on a first end and at least one action node on a second end; receiving a user-generated input identifying a selected graphical user interface element within the control, such that the selected graphical user interface element corresponds to a selected action; receiving a user-generated input corresponding to a request for generation of an action graph based on the selected action and a desired visualization criteria; generating the action graph based on the selected action node, the linked nodes within the hierarchical structure and the desired visualization criteria; and, displaying the action graph to the user.

For example, the desired visualization criteria can comprise replacing the root node with a first line; connecting all nodes previously directly connected to the root node to the first line; replacing the currently selected node with a second line; and connecting all nodes previously directly connected to the currently selected node to the second line. In some implementations, this form of the visualization can be used for action graph representation. Specifically, a single start node of the action graph can be replaced with the first line and a single action node of the action graph can be replaced with the second line. In some implementations, the action graph can be leveled. In some implementations, each level of the action graph can be displayed by the control using alternating background colors.

The action graph can also be optimized. For example, a leveled action graph can be optimized by finding the optimal order of levels that results in the fewest number of nodes, while maintaining logical equivalence. In some implementations, wherein at least one of the linked nodes corresponds to at least one condition, the action graph can be optimized by simplifying at least one condition while maintaining logical equivalence.

In yet a further aspect, the visualization of decision logic can be implemented by loading a first form of the decision logic into a GUI control. The GUI control can comprise a plurality of graphical user interface elements corresponding to linked nodes within the first form of the decision logic; receiving a request to display the decision logic in a second form, such that the second form of the decision logic is logically equivalent to the first form of the decision logic; and, providing the second form of the decision logic to a user. In some implementations, the second form of the decision logic can be calculated in response to the request to display the decision logic in the second form. In some implementations, the calculated second form of the decision logic can be optimized. The calculated second form of the decision logic can be saved to a memory. In some implementations, the decision logic can also be loaded from the memory in response to the request to display the decision logic in the second form. In one variation, the decision logic can be visualized by generating a set of action graphs. In some implementations, at least one action graph can be selected from the set of the generated action graphs and displayed to the user.

In one variation, at least one of the first form and the second form can be selected from any of the leveled decision tree, unleveled decision tree, leveled DAG, leveled EDAG, and set of action graphs. For example, at least one of the first form and the second form can be leveled and the ordering of said levels can be chosen by the user. The ordering of said levels can also be determined automatically. In some variations, the optimal ordering of said levels can be determined automatically to minimize the number of the linked nodes.

In one implementation, at least one of the first form and the second form can be represented by an EDAG structure, such that at least one of the linked nodes of the EDAG structure is an exception node and the exception node is selected to minimize the number of the linked nodes. In some variations, at least one of the linked nodes of the EDAG structure is an exception node and the exception node is chosen by the user.

In another aspect, a system and a method can be implemented by receiving a request from a user to evaluate a decision logic, the request corresponding to an activation of a user interface control. Based on the received request, generating an action graph for an action node corresponding to the action, the action graph comprising a plurality of linked nodes within a hierarchical structure, the hierarchical structure comprising at least one root node on a first end, at least one action node on a second end and at least one condition node disposed between the first end and the second end; following each link of the root node to a corresponding linked node. For each corresponding link node, iteratively performing the following: if the corresponding link node is the action node, assigning the action corresponding to the action node; if the corresponding link node is a condition node and a condition corresponding to the condition node evaluates to TRUE, following each link of the condition node to a corresponding link node.

In another aspect, a system and a method can be implemented by receiving a request to generate a set of action graphs corresponding to a hierarchical structure from a user; receiving the hierarchical structure representing a population divided into at least one population subset, such that the at least one population subset is assigned to an action; for each action represented by the hierarchical structure, generating an action graph, such that the action graph corresponds to a unique population subset and the unique population subset corresponds to a single action graph, wherein the join of the unique population subsets is equivalent to the population represented by the hierarchical structure.

Articles are also described that comprise a machine-readable storage medium embodying instructions that when performed by one or more machines result in operations described herein. Similarly, computer systems are also described that may include a processor and a memory coupled to the processor. The memory may encode one or more programs that cause the processor to perform one or more of the operations described herein.

The details of one or more variations of the subject matter described herein are set forth in the accompanying drawings and the description below. Other features and advantages of the subject matter described herein will be apparent from the description and drawings, and from the claims.

DETAILED DESCRIPTION

Techniques for the visualization of various forms of decision logic are described. Some techniques describe visualization of various forms of decision logic by transforming one form of decision logic into another. Some techniques describe visualization of various forms of decision logic by generation of action graphs and selection of individual nodes within decision logic representations.

In one implementation, the system and the method can be implemented by providing a control within a graphical user interface to a user. The control can display a plurality of graphical user interface elements corresponding to linked nodes within a hierarchical structure. An input identifying a selected graphical user interface element within the control can be generated by a user. A selected node within the hierarchical structure can be identified based on the selected graphical user interface element. A user can also generate a request for modifying an appearance of a subset of the linked nodes within the hierarchical structure based on a desired visualization criteria, the linked nodes within the hierarchical structure and the selected node. Based on the request, an appearance of one or more graphical user interface elements within the control can be modified.

In some implementations, the visualization of decision logic can be performed by loading a first form of the decision logic into a GUI control. The GUI control can comprise a plurality of graphical user interface elements corresponding to linked nodes within the first form of the decision logic. The method also describes receiving a request to display the decision logic in a second form, such that the second form of the decision logic is logically equivalent to the first form of the decision logic; and, providing the second form of the decision logic to a user. In some implementations, the second form of the decision logic can be calculated in response to the request to display the decision logic in the second form. The calculated second form of the decision logic can be saved to a memory. In some implementations, the decision logic can also be loaded from the memory in response to the request to display the decision logic in the second form.

For example, a user can reduce the number of nodes in a decision logic represented by a decision tree structure by transforming that decision tree into a DAG or an EDAG structure. Both DAG and EDAG structures generally have smaller number of nodes than the logically equivalent decision trees. As a result, such transformation can be beneficial for visualization purposes.

Figure 1:
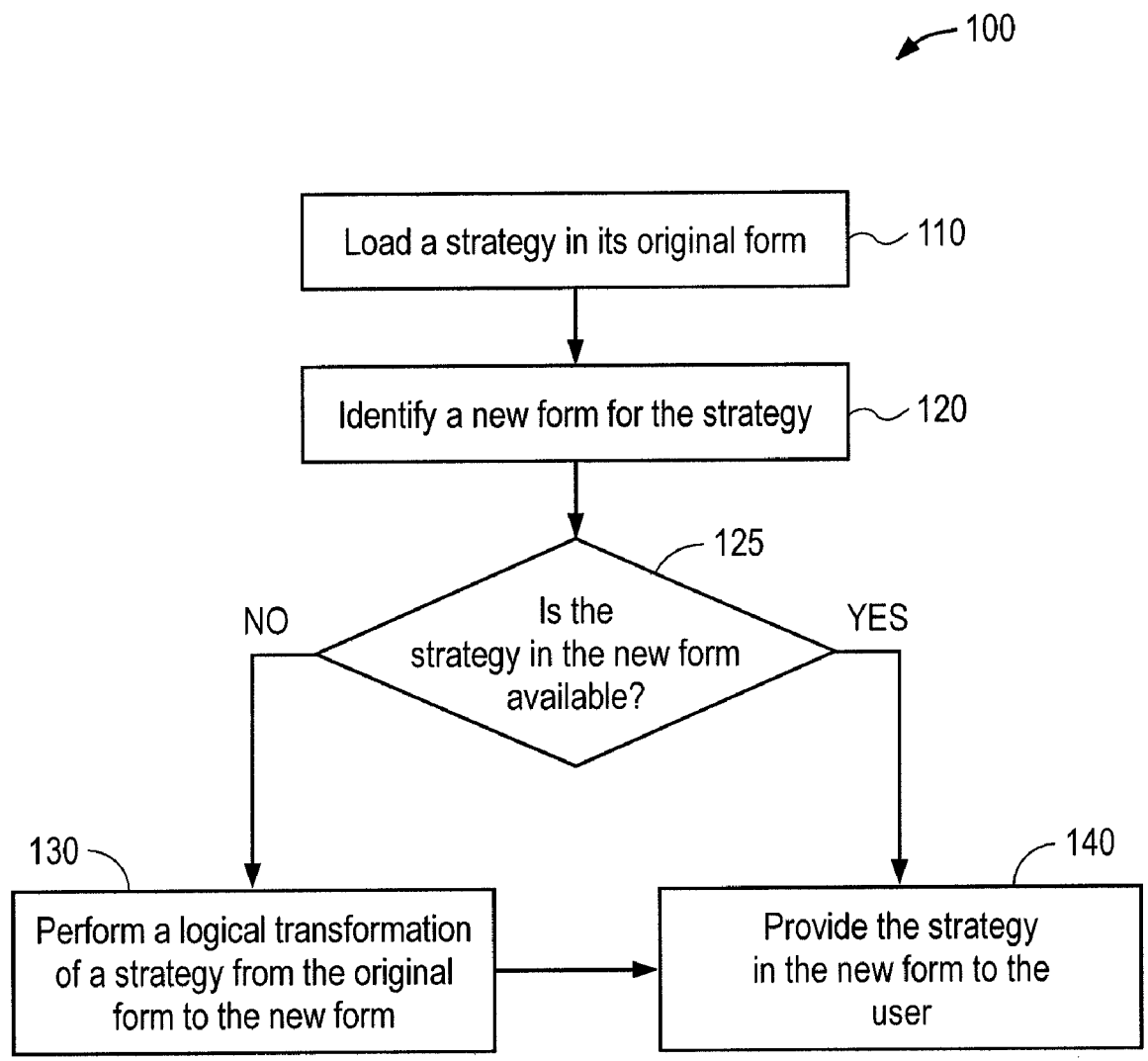
FIG. 1 is a process flow diagram illustrating one method for visualizing a decision logic.

FIG. 1 illustrates a method 100 that can be used to transform decision logic from one form to another. At 110, decision logic in its original form can be loaded. For example, the user might open a file that contains a representation of the decision logic in an unleveled tree form. Alternatively, the user might use a tree editor GUI to specify the decision logic as a tree.

In some implementations, the decision logic can be loaded into a control displayed within a graphical user interface. The control can be made up of a plurality of graphical user interface elements corresponding to linked nodes within the decision logic. For example, the decision logic can be loaded in any of the following forms:
  Leveled or unleveled Decision Tree;
  Leveled DAG;
  Leveled EDAG;
  Two or more leveled action graphs;
  Leveled Trees, DAGs, EDAGs, or action graphs that use an ordering for levels chosen by the user;
  Leveled Trees, DAGs, EDAGs, action graphs that use an ordering for levels determined automatically to minimize the number of nodes and links;
  EDAGs that use an action for the Exception node that minimizes the number of nodes and links in the EDAG;
  EDAG's that use an action for the Exception node chosen by the user At 120, a new form for the decision logic can be identified. For example, the new form can be identified by a user. Specifically, the user can:
  Click a button to see the decision logic as a DAG;
  Click a button to see the decision logic as an EDAG;
  Choose an action from a listbox to see the action graph for a selected action;
  Click a button to see the decision logic as a leveled tree;
  Choose a menu item and specify an ordering of levels in a dialog box to see the leveled tree, DAG, EDAG, or action graph with that order;
  Choose a menu item to see the leveled tree, DAG, EDAG, or action graph with the level ordering that minimizes the number of nodes and links;
  Choose a menu item and select an action from a dialog box to see a leveled EDAG using that action as the Root Exception node;
  Choose a menu item to see a leveled EDAG using an action in the Root Exception node that minimizes the number of nodes and links in the EDAG.

The new form can also be identified automatically, for example, to simplify the representation of the decision logic. In some implementations, the new form can also be preconfigured by a user or an administrator.

At 125, a system can detect whether the decision logic in the new form is already available. For example, the decision logic in the new form could have been created and saved in memory, a file or a database. In some implementations, a repository of all existing decision logic in all existing forms can be maintained. This repository can be updated every time a new form for a decision logic has been created.

If the decision logic in its new form is not available, at 130, a logical transformation can be performed to transform the decision logic from its original form into its new form. The results of that transformation can be saved for a later use. For example, the following transformations can be implemented:
  Compute the leveled tree that represents the same decision logic as the given unleveled tree, and uses the leveling that minimizes the number of nodes and links in the tree;
  Compute the leveled DAG that represents the same decision logic as the given unleveled tree, and uses the leveling that minimizes the number of nodes and links in the DAG;
  Compute the leveled EDAG that represents the same decision logic as the given unleveled tree, and uses the leveling, and the choice of action for the exception node, that minimizes the number of nodes and links in the EDAG;
  Compute the set of action graphs that represents the same decision logic as the given unleveled tree, with an action graph for every action assigned by the decision logic, where the specific leveling is requested by the user;
  Compute the set of action graphs that represents the same decision logic as the given unleveled tree, with an action graph for every action assigned by the decision logic, where the specific leveling is computed so as to minimize the number of nodes and links in the action graphs;
  Compute the leveled tree that represents the same decision logic as the given tree, but which uses a specific leveling requested by the user;
  Compute the leveled tree that represents the same decision logic as the given tree, but which uses a leveling that minimizes the number of nodes and links in the tree.

Compute the leveled DAG that represents the same decision logic as the given DAG, but which uses a specific leveling requested by the user;
    Compute the leveled DAG that represents the same decision logic as the given DAG, but which uses a leveling that minimizes the number of nodes and links in the DAG;
    Compute the leveled EDAG that represents the same decision logic as the given EDAG, but which uses a specific leveling requested by the user.
    Compute the leveled EDAG that represents the same decision logic as the given EDAG, but which uses a leveling that minimizes the number of nodes and links in the EDAG.
    Compute the EDAG that represents the same decision logic as the given EDAG, but which uses a specific action for the Exception node chosen by the user.
    Compute the EDAG that represents the same decision logic as the given EDAG, but which uses an action for the Exception node that minimizes the number of nodes and links in the EDAG.

Generation of action graphs and selection of individual nodes within the decision logic can also improve the visualization of the decision logic. In one implementation, a user can select a subset of nodes from a decision tree based on specified criteria, thereby reducing the number of nodes that should be visualized. For example, the user may want to inspect a subset of nodes that are positioned above or below the currently selected node. Similarly, the user may want to inspect children or parents of the currently selected node. In some implementations, the user can inspect a subset of nodes that are directly linked to the currently selected node.

A user can also select a subset of nodes from a decision tree based on frequency information. This information can be retrieved from a data store, such as a log file or a database. For example, the frequency information can indicate that one path of the decision tree is leading to a specific action more frequently than any other path. In one variation, only that portion of the tree that leads to a specific action more frequently than any other portion can be visualized.

In some implementations, a software component can display the control within a graphical user interface to a user. For example, the control can be implemented as a Windows graphical user interface ("GUI") control designed to display decision tree structures.

In some variations this control can provide a set of application programming interfaces (APIs) allowing software developers to modify various attributes of this control. Some attributes can include parameters such as background color, font type, font size, etc. The control can further be embedded in an application. The control can retrieve data necessary for displaying of a tree from a database and/or from a text file.

A decision tree structure, in one variation, can be implemented as a plurality of graphical user interface elements corresponding to linked nodes within a hierarchical structure. Each node can have its own collection of properties controlling its size, shape, color and appearance of the text within nodes (i.e. font, size, alignment, etc.).

In some variations, the hierarchical structure displayed by the control can comprise one root node on a first end, at least one action node on a second end, and at least one condition node disposed between the first end and the second end.

A user can select the desired visualization criteria using, for example, a drop down menu or a dialog box designed for that purpose. The desired visualization criteria can also be selected by default. A request for modifying an appearance of one or more nodes can be generated if a user clicks on a graphical user interface button labeled, for example, "Highlight." In another variation, the button can be labeled with an image instead of or in addition to the labeling text. A request for modifying the appearance of one or more nodes can also come from a menu item. Whichever GUI control is chosen for initiating requests for modifying an appearance of decision trees, this control can send a notification to a software component responsible for highlighting or otherwise changing a visual appearance of the nodes (e.g., making the nodes visually distinct from the other nodes).

In some variations, the software component can also receive user-generated input selecting one of the nodes within the hierarchical structure by activating a graphical user interface element corresponding to the selected node. The user's input can be generated by using a computer mouse or another input device. The user's input can also be generated by using arrow keys on a computer keyboard. In another variation, the user's input can be generated simply by the user opening a specific decision tree, causing the GUI to select a particular node by default.

In some variations, the selected node can represent a condition. In other variations the selected node can represent an action. The resulting graph can have one or more nodes, and one or more of such nodes can have a distinctive visual appearance.

A user can also change an appearance of the nodes within the hierarchical structure based on multiple selected nodes. Specifically, a user can select multiple nodes by, for example, holding a Ctrl key and clicking on each node using the mouse pointer. After multiple nodes are selected, a user can change a visual appearance (e.g., highlight, etc.) of portions of the tree for each selected node based on the desired criteria.

Figure 2:
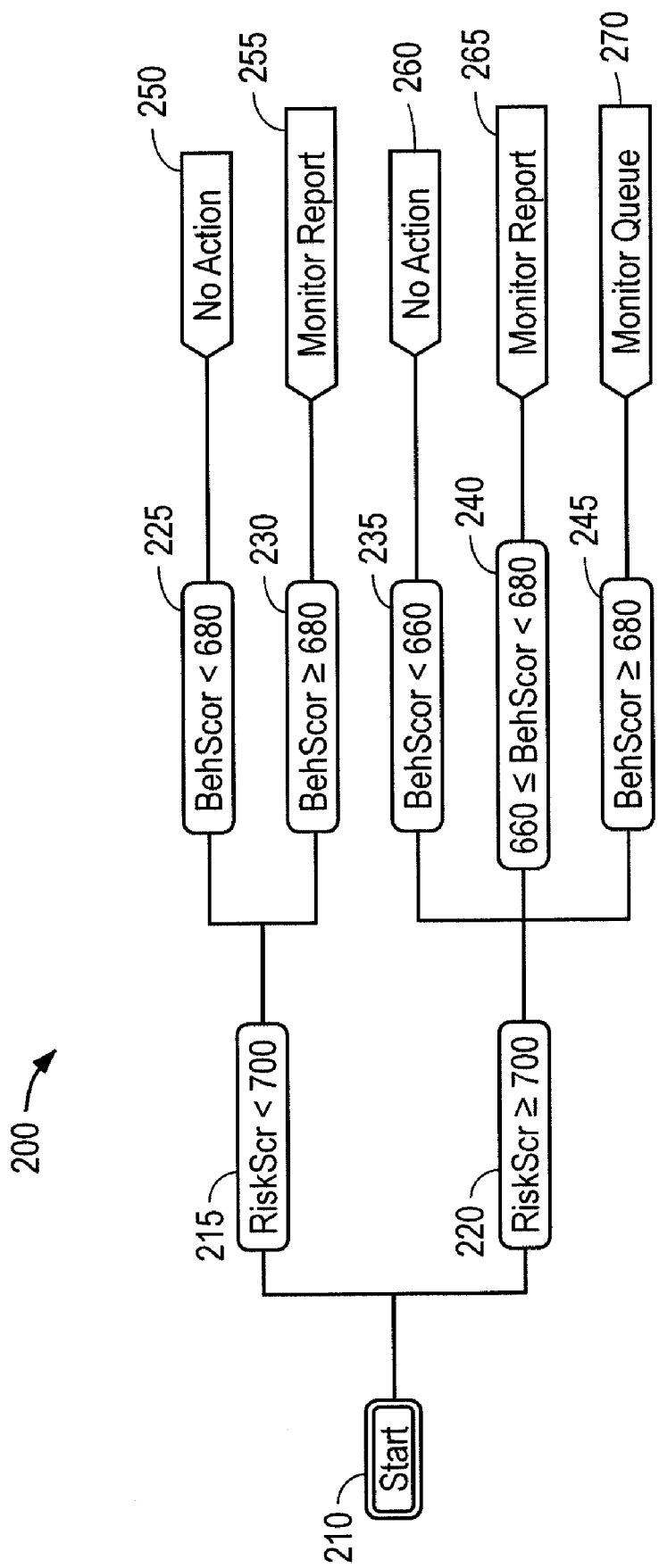
FIG. 2 provides an example of a decision tree.

FIG. 2 provides a diagram of one variation of a decision tree 200. In this variation, the structure of the decision tree 200 has one root node 210. The decision tree 200 also has seven condition nodes 215-245. The decision tree 200 also has five action nodes 250-270.

Each one of the condition nodes 215-245 represents a condition that can be tested on one or more variables. For example, the condition node 215, can be associated with evaluation of an "RiskScr" variable. In one implementation, the condition node 215 can test if the value of the "RiskScr" variable is less than 700. If this condition is true, the decision process can evaluate conditions associated with condition nodes 225 and 230. If the RiskScr variable is greater than or equal to 700, then the condition node 220 will evaluate to true and the progress will be made to the three condition nodes 235-245. Some conditions can consist of a set of logical conditions, one of which must be true at any time, along with a mapping of each logical condition to one of the node's children links.

Similarly, condition nodes 225-245 test the value of the "BehScor" variable. For example, if the BehScor variable is less than 680, the condition associated with the node 225 will evaluate to true. As a result a decision process will proceed to the action node 250. In one implementation the action node 250 can be associated with a "No Action" command.

Each one of the five action nodes 250-270 can represent one or more actions that should be taken according to the decision tree 200. In some variations an action can also represent a logical conclusion. In other variations, an action can represent a command to perform with one or more instructions. For example, an action node may request execution of another decision tree.

Figure 3:
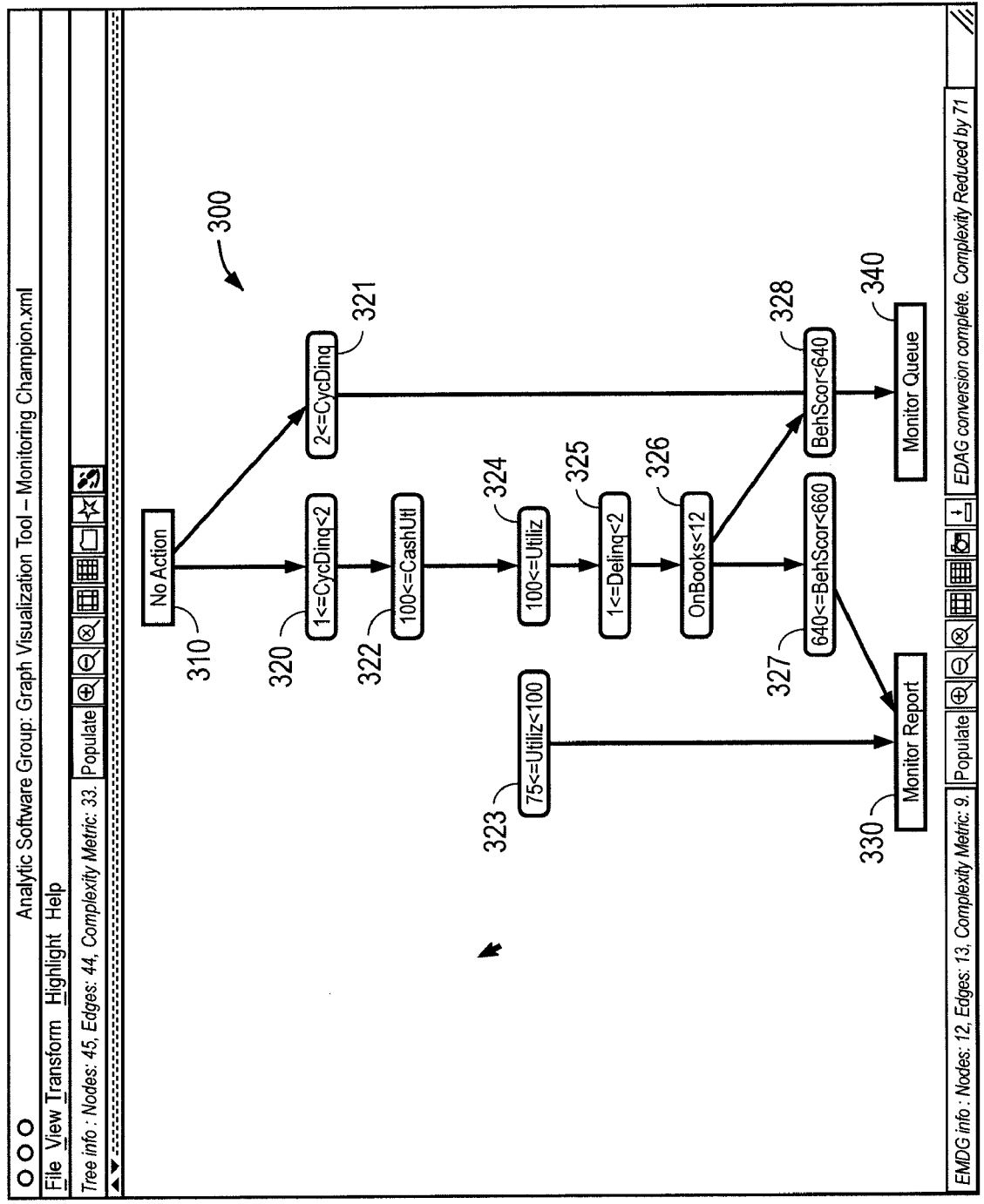
FIG. 3 provides an example of an EDAG structure.

FIG. 3 provides another representation of decision tree 200. The logic structure labeled 300 can also be referred to as an exception-based directed acyclic graph ("EDAG").

EDAGs are node and link structures that can represent decision logic. For example, Gaines, "Transforming Rules and Trees into Comprehensible Knowledge Structures", *Knowledge Discovery in Databases II*. AAAI/MIT Press 1995, incorporated hereto by reference in its entirety, describes several features of EDAGs including:

All paths through the graph are traced from each of its root nodes

For each node on a path, if the premise (if any) is TRUE then the conclusion (if any) is noted for that path, replacing any previous conclusion noted for the path.

A path is traced until a premise fails to hold, or an action node is reached.

When a path has been traced, any conclusion noted is asserted.

In the example of the FIG. 3, the EDAG 300 can be resolved to three possible conclusions:

1. No Action;
2. Monitor Report;
3. Monitor Queue.

The root node 310 can be associated with the "No Action" conclusion. The EDAG 300 can resolve to the "No Action" conclusion if the intermediate condition nodes prevent the EDAG 300 from resolving to any other conclusion. The action node 330 can be associated with the "Monitor Report" conclusion. The "Monitor Report" conclusion can be reached if condition nodes 320, 322, 323 resolve to TRUE. The "Monitor Report" conclusion can also be reached if condition nodes 320, 322, 324, 325, 326 and 327 resolve to TRUE. Similarly, the "Monitor Queue" conclusion can be reached if the condition nodes 321, and 328 resolve to TRUE. The "Monitor Queue" conclusion can also be reached if the condition nodes 320, 322, 324, 325, 326 and 328 resolve to TRUE.

The condition nodes 320-328 can be resolved either to TRUE or to FALSE. Each condition node can be resolved to true if the condition associated with the node is satisfied. For example, the condition node 321 is associated with the condition 2<=CycDInq. Consequently, if the value of the CycDInq variable is greater than or equal to 2, the condition node 321 will resolve to TRUE. If the value of the CycDInq variable is less than 2, the condition node 321 will resolve to FALSE.

The EDAG 300 can test the values of six different variables. Specifically, the nodes 320 and 321 can test the value of the "CycDInq" variable. The node 322 can test the value of the CashUtl variable. The nodes 323 and 324 can test the value of the Utiliz variable. The node 325 can test the value of the Delinq variable. The node 326 can test the value of the OnBooks variable. The nodes 327 and 328 can test the value of the BehScor variable.

To simplify the analysis of the logic leading to a particular node, it can be beneficial to highlight only a portion of the decision tree or graph. In the EDAG 300 illustrated in FIG. 3, a user can highlight parent nodes leading to the action node "Monitor Report" 330. This can be accomplished by selecting the node 330, choosing a visualization type and requesting that the software application perform the visualization action. The result of this request can be EDAG 400 illustrated in FIG. 4. Note that for the purposes of visualizing, a user can select any node, not only the action-type node as demonstrated in this example. In some implementations, the user can highlight:

1. Parents of the selected nodes
2. Children of the selected nodes
3. Ancestors of the selected nodes
4. Descendants of the selected nodes
5. Ancestors and Descendants of the selected nodes
6. Siblings of the selected nodes
7. nodes with the same variables as the selected nodes In addition, the user can select how the chosen nodes will be highlighted:

1. By color
2. By fading
3. By visibility

Figure 4:
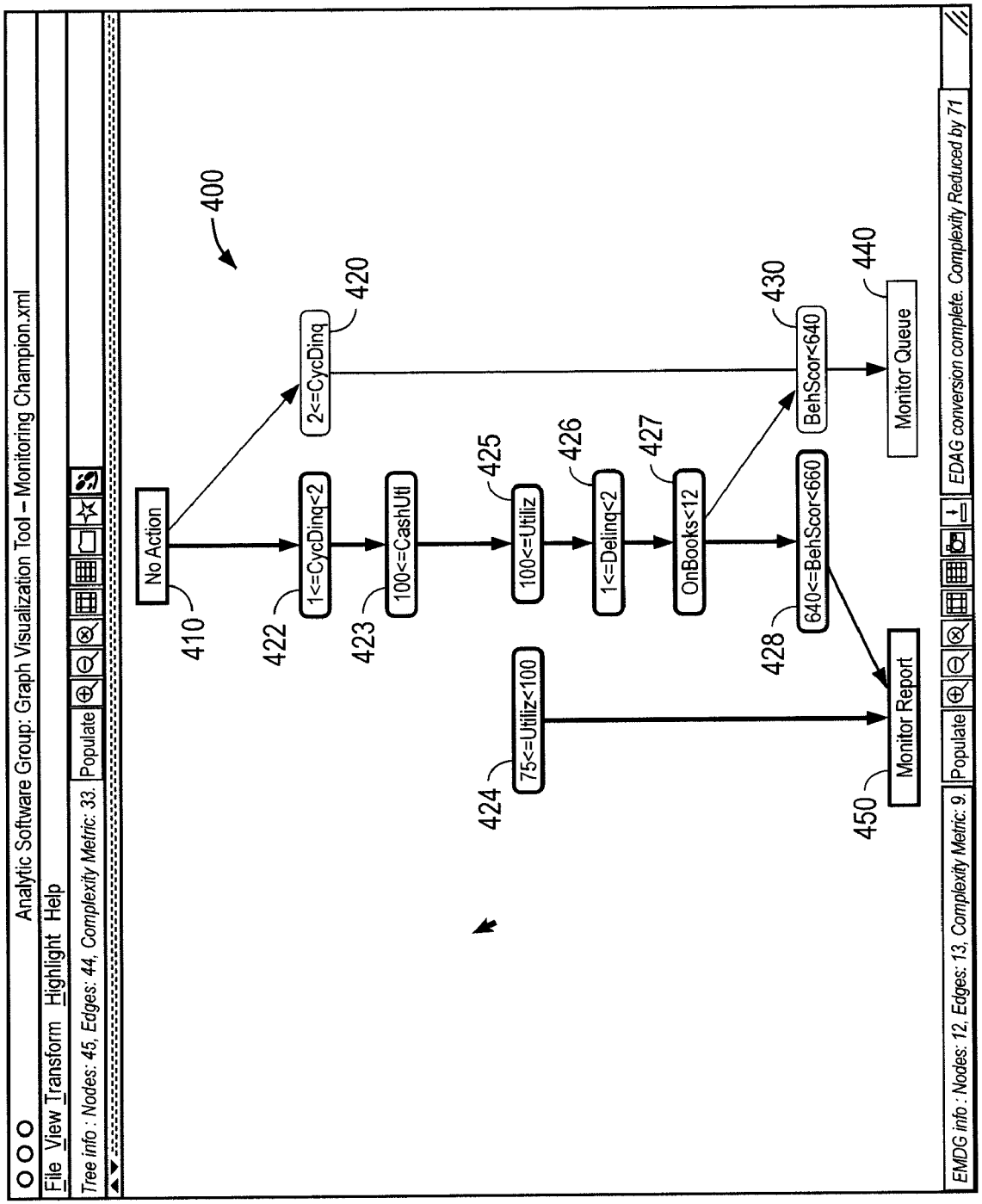
FIG. 4 is a diagram illustrating a structure in which the user has selected the leftmost terminal node and has chosen to highlight nodes that are ancestors of the currently selected node.

In the example of the EDAG 400 in FIG. 4, a scenario is illustrated in which the user has selected the leftmost action node Monitor Report 450 and has chosen to highlight ancestor nodes of the currently selected node. This example demonstrates the effect of highlighting by color. Note that the nodes that are ancestors of the selected node 422-428 are displayed in full color, while nodes 420, 430 and 440, which are not ancestors of the selected node, are displayed in light grey.

Figure 5:
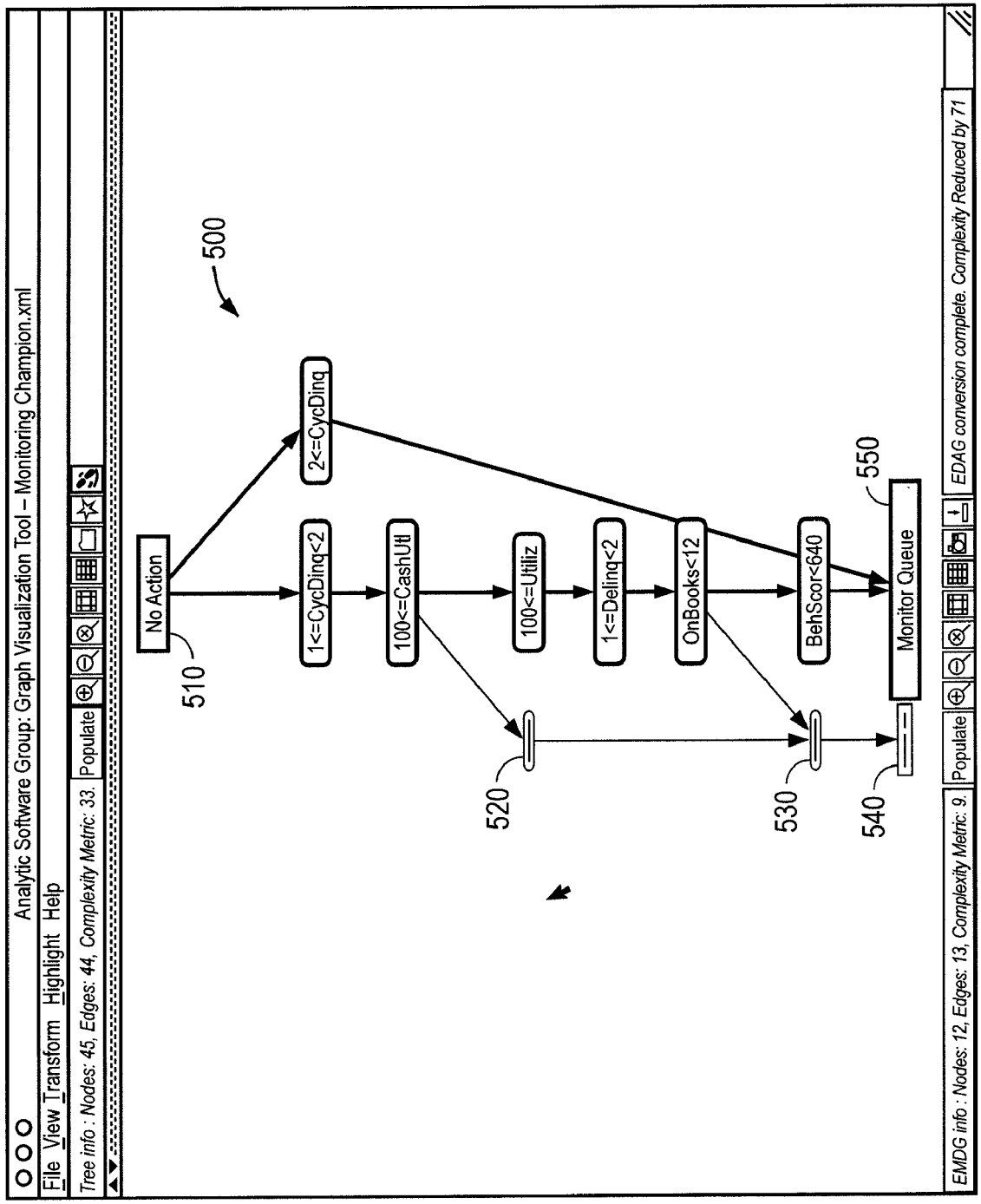
FIG. 5 is a diagram illustrating a structure that includes highlighting by fading.

In the example of the EDAG 500 in FIG. 5, a scenario is illustrated in which the user has selected the rightmost action node Monitor Queue 550 and has chosen to highlight ancestor nodes of the currently selected node by fading. Here the nodes 520, 530 and 540 that are not ancestors of the currently selected node can be drawn smaller, and in grey and, in doing so, appear to fade into the distance.

Figure 6:
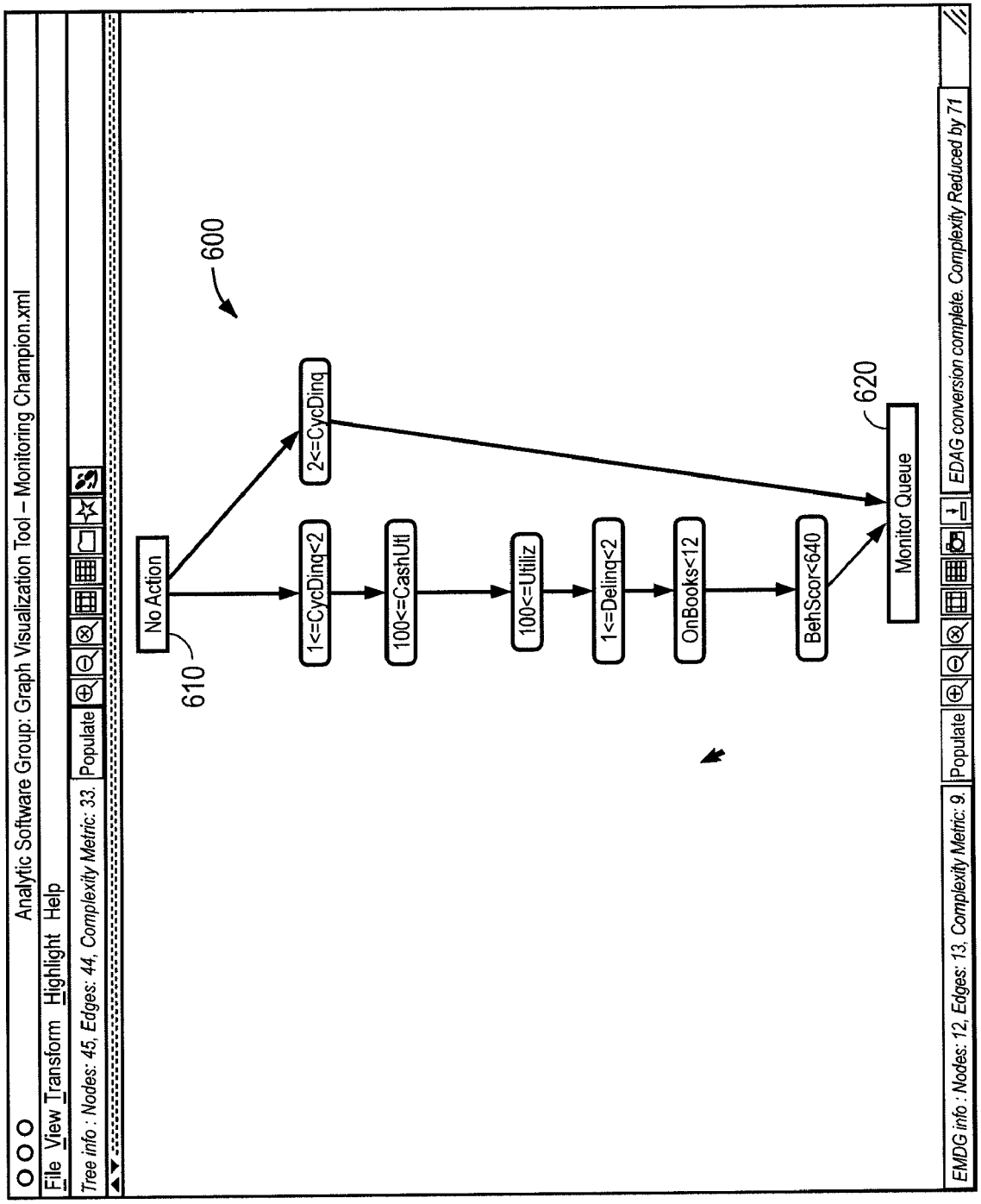
FIG. 6 is a diagram illustrating a structure that shows the effect of highlighting by visibility, where all ancestors of the selected action node are highlighted.

In the example of the graph 600 in FIG. 6, a scenario is illustrated in which the user has selected the rightmost action node Monitor Queue 620 and has chosen to highlight ancestor nodes of the currently selected node 620 by visibility. In this arrangement, the nodes that are not ancestors of the currently selected node are not displayed at all, and the structure that is displayed is reoriented in a more visually appealing form, causing it to stand out in sharp focus.

Figure 7:
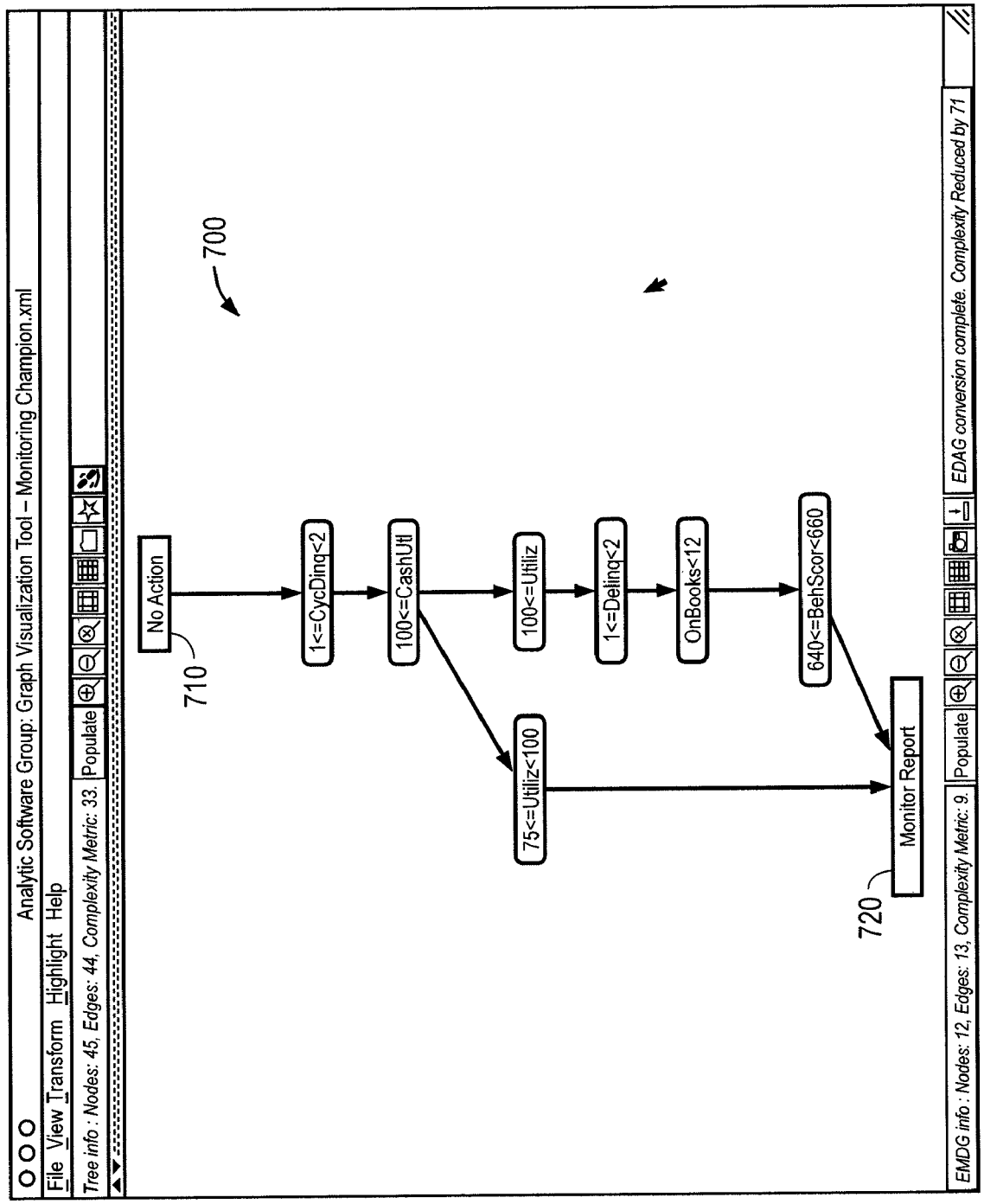
FIG. 7 is a diagram illustrating a structure that shows the effect of highlighting by visibility, in which the selected action node has been changed.

Regardless of what highlighting mechanism is selected, the user can navigate through the structure with arrow keys, thus changing the selected node. In one implementation, the user can use the left and right arrow keys to change the selected action node. For example, if a user is looking at the graph 600 illustrated in FIG. 6 and the node Monitor Queue 620 is currently selected, the user can change the currently selected action node by pressing the left arrow key. The result of that action can be a graph 700 illustrated in FIG. 7.

When highlighting by visibility is used, prior to pressing the arrow key, the user may not necessarily see the node that can be selected. For example, a left arrow key can be associated with changing selected node to the next available node within the tree (as opposed to a portion of the tree currently displayed to the user) on the same level and appearing to the left from the currently selected node. If the highlighting by visibility is used, the user may not see nodes appearing on the same level with the currently selected node.

While the graphs 500 and 600 illustrate different highlighting mechanisms, the value of those highlighting mechanisms is better revealed when more typical, more complex decision trees are inspected. For example, the decision tree 800 can be displayed in the "highlighting by fading" mode. The benefits of "fading" other nodes are apparent because this technique isolates for the user relevant portions of the tree, while indicating the complexity of the entire structure. In this example, the tree 800 shows all paths that start at the root node 810 and lead to the action node 820, while fading all other paths within the tree.

Figure 8:
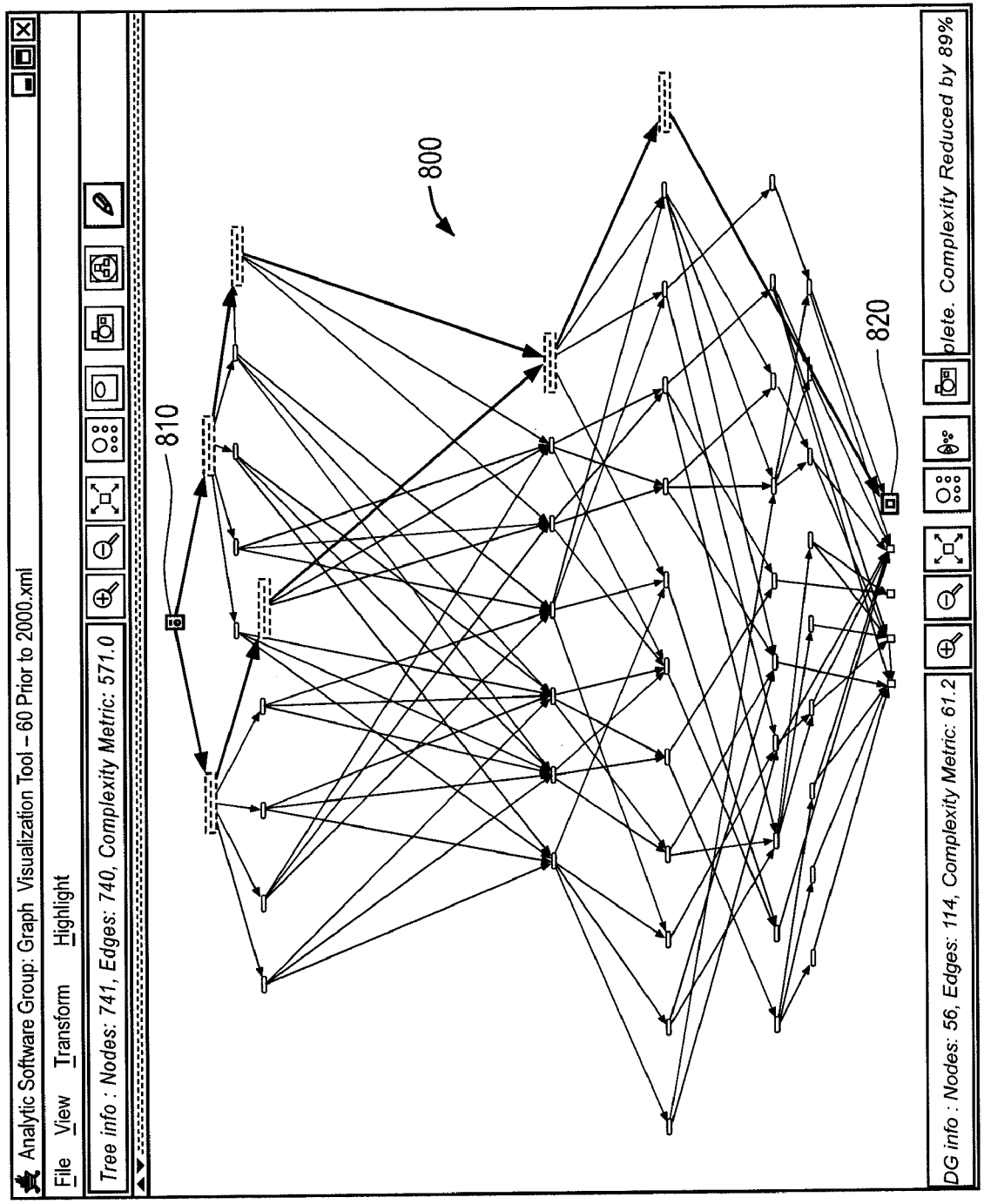
FIG. 8 is a diagram illustrating a structure in highlighting by fading mode.
Figure 9:
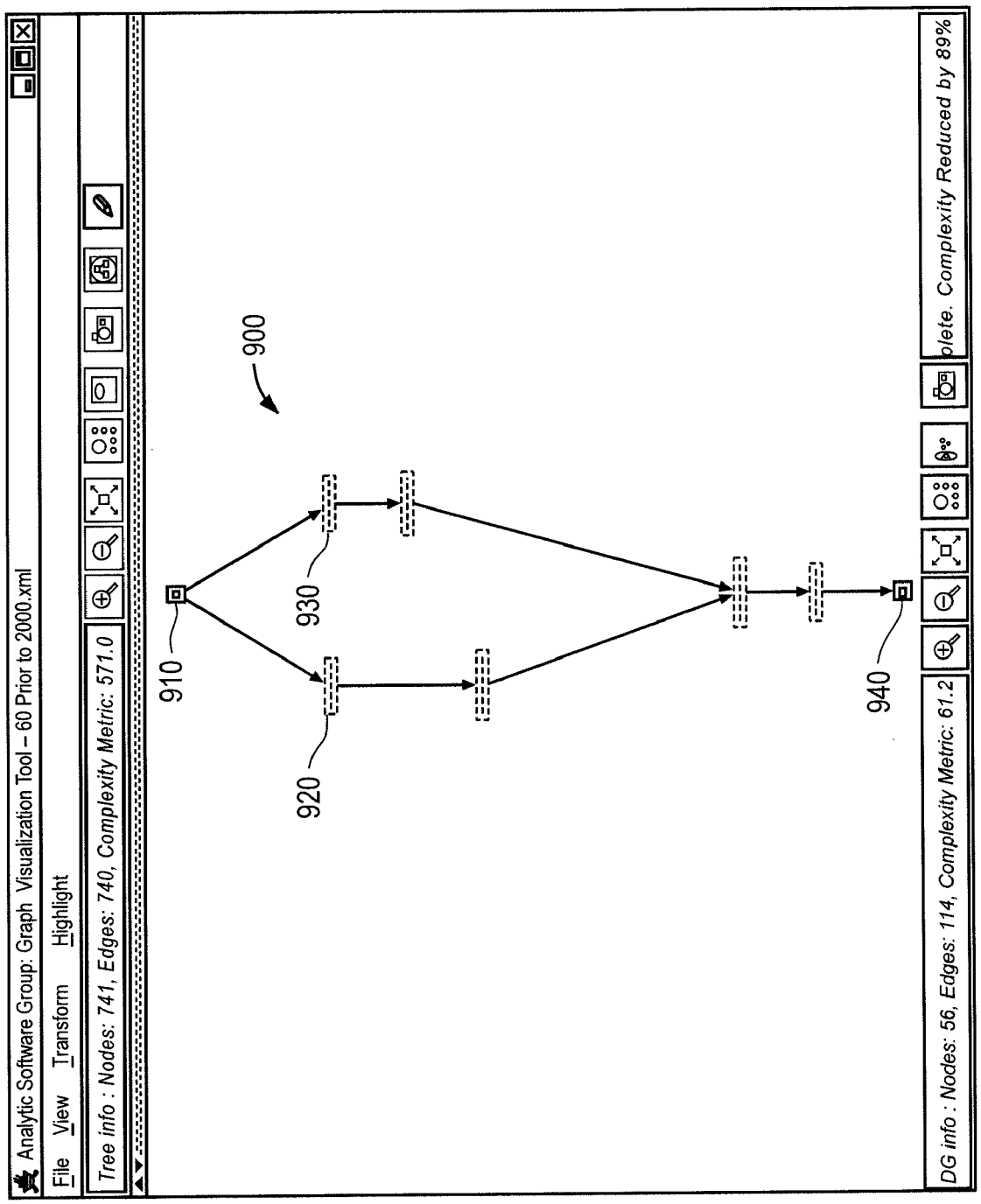
FIG. 9 is a diagram illustrating a structure in highlighting by visibility mode.

Similarly, the decision tree 900 illustrated in FIG. 9 shows the same relevant nodes as illustrated in FIG. 8, however it shows these nodes in "highlighting by visibility mode". In this example, only two condition nodes 920 and 930 that are derived from the root node 910 can be seen because they lead to the action node 940. Many other condition nodes that can be derived from the root node 910 are hidden because they do not lead to the action node 940.

A user can also generate "action graphs." An action graph represents a set of nodes connected by links that visually describe the population subset that is assigned a particular action by the decision logic. An action graph allows the analyst to see and understand the conditions for assigning one of the decision logic's actions in isolation from the conditions for assigning all the other decision logic's actions. Often the decision logic is very complex, as a result, it can be helpful to focus on only a portion of that logic. Action graphs can be used to subdivide the logic according to the action assigned. In other words, the user can just examine the logic corresponding to a subset of the population that is assigned a particular action, and while doing so, can ignore all the members of the population that are assigned other actions.

The generated action graph can be optimized. For example, leveled action graphs can be optimized by modifying the order of the levels so as to generate a logically equivalent action graph with the minimized number of linked nodes.

An action graph has a single root node (or start node) and it has a single action node. Each node has either a single link going towards the action node, or one or more links going towards condition nodes. Each link can go towards a node that has links coming in from other nodes. In other words, nodes can have more than one parent node. Action graphs do not support links that create cycles in the graph.

An action graph represents a decision process that determines whether to assign the action represented by the action graph or not. For example, each condition node corresponds to one of the decisions in the decision logic. Beginning at the start node, each link to either an action node or a condition node can be explored. Once a condition node that evaluates to true is reached, the decision can proceed down one of its arcs. If a condition node that evaluates to false is reached, then the decision process can back up and explore other links from previously visited nodes. If the decision process reaches the action node, then the action represented by this action graph can be assigned. If there are no paths that lead to the action node where all the decision conditions are true, this action represented by this action node is not assigned.

Some decision logic can be represented by a set of action graphs, such that each action within the decision logic is represented by its own action graph. For example, to represent the decision logic, the set of action graphs can follow two rules. First, each action graph can represent a population disjoint from the populations represented by the other action graphs. In other words, there is no "overlap", or some combination of decisions that can be assigned actions from the two or more action graphs. Second, the populations of all the action graphs together can represent the complete population being treated by the decision logic. In other words, there is no "gap", or some combination of decisions that is not assigned an action by any of the action graphs.

To display the complete decision logic to the user, all action graphs can be displayed to the user at once. Alternatively, action graphs can be displayed one at a time, and the user can choose which action graph to show with a GUI control.

Figure 10:
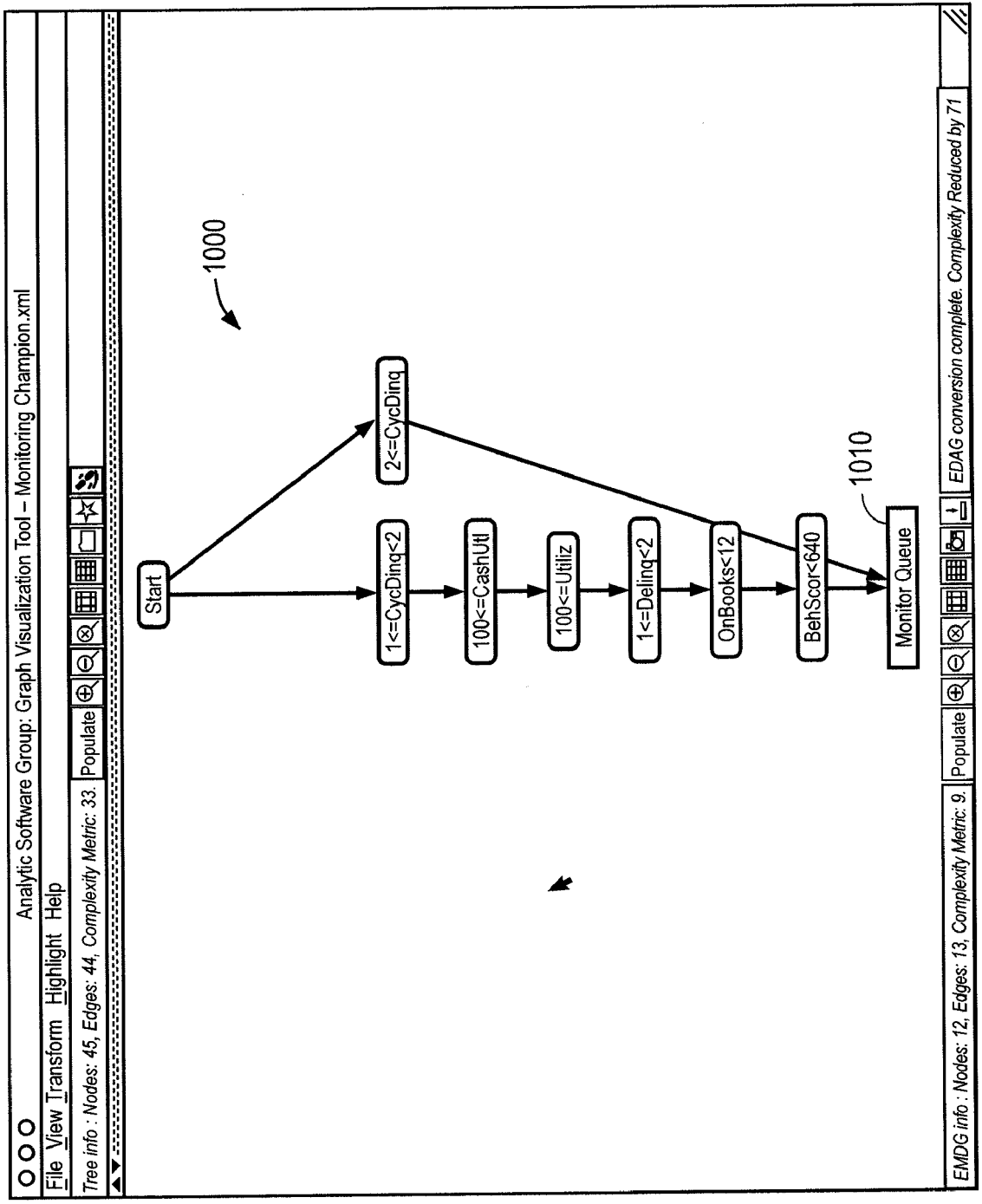
FIG. 10 is a diagram illustrating a first action graph.
Figure 11:
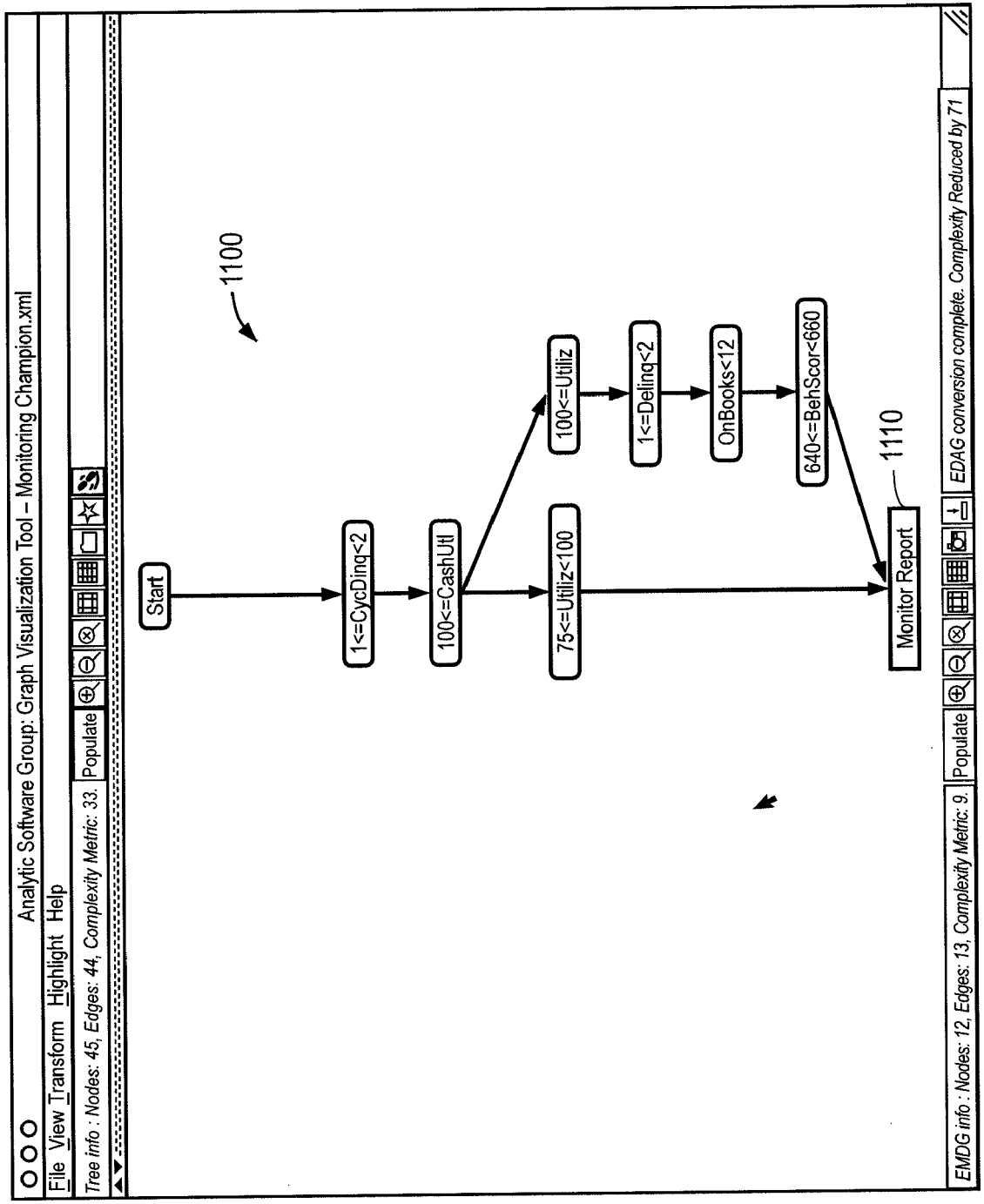
FIG. 11 is a diagram illustrating a second action graph.
Figure 12:
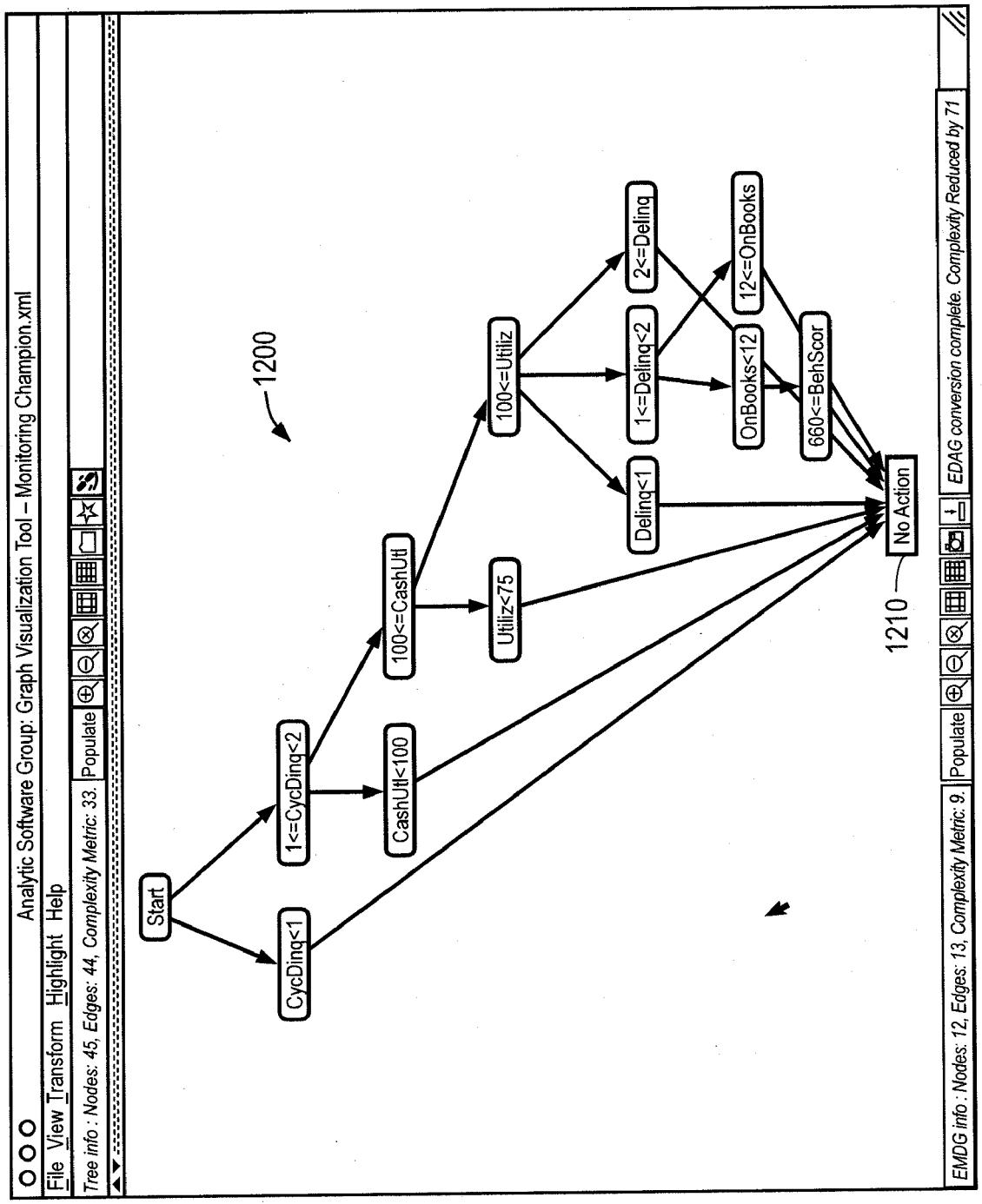
FIG. 12 is a diagram illustrating a third action graph.

For example, FIG. 10 illustrates the action graph 1000 for the action "Monitor Queue", represented by action node 1010. FIG. 11 illustrates the action graph 1100 for the action "Monitor Report", represented by action node 1110. FIG. 12 illustrates the action graph 1200 for the action "No Action", represented by action node 1210. In each one of these action graphs, a user can analyze the logic leading to a single action, as opposed to analyzing the entire decision logic.

The action graphs 1000, 1100 and 1200 can be generated either serially or in parallel. As explained above, a user can select an individual action node and then generate an action graph for that node. Alternatively, a user can generate a collection of action graphs for every single action node within the decision tree. This can be useful to subdivide large decision trees into a plurality of smaller graphs that each lead only to a single action.

In one variation, a software component responsible for generating action graphs can parse the entire decision tree to calculate the nodes that should be included in the action graph. For example, the software component can include a module configured for selecting a subset of paths that lead to a particular node within the decision tree. In one variation, this module can select the nodes by parsing the entire tree, starting from every available root node and navigating through all possible paths within the tree. That software module can maintain a list of all paths. In one variation, the software module responsible for paths selection can iterate through all paths and, from the collection of these paths, select only those that lead to the selected node. In this variation, the parsing of the tree can be referred to as "top-down."

In other variations, the software module responsible for paths selection can parse the tree starting from the action node. In this example, the software module will iterate through all paths that lead from the selected action node to one or more root nodes. This type of parsing can be referred to as "bottom-up."

In other variations, the software module responsible for paths selection can identify necessary paths to the software component responsible for the action graph generation. In one variation, the software component responsible for action graph generation can use the identified paths received from the software module responsible for path identifications to mark these paths within the decision tree for highlighting.

Figure 13:
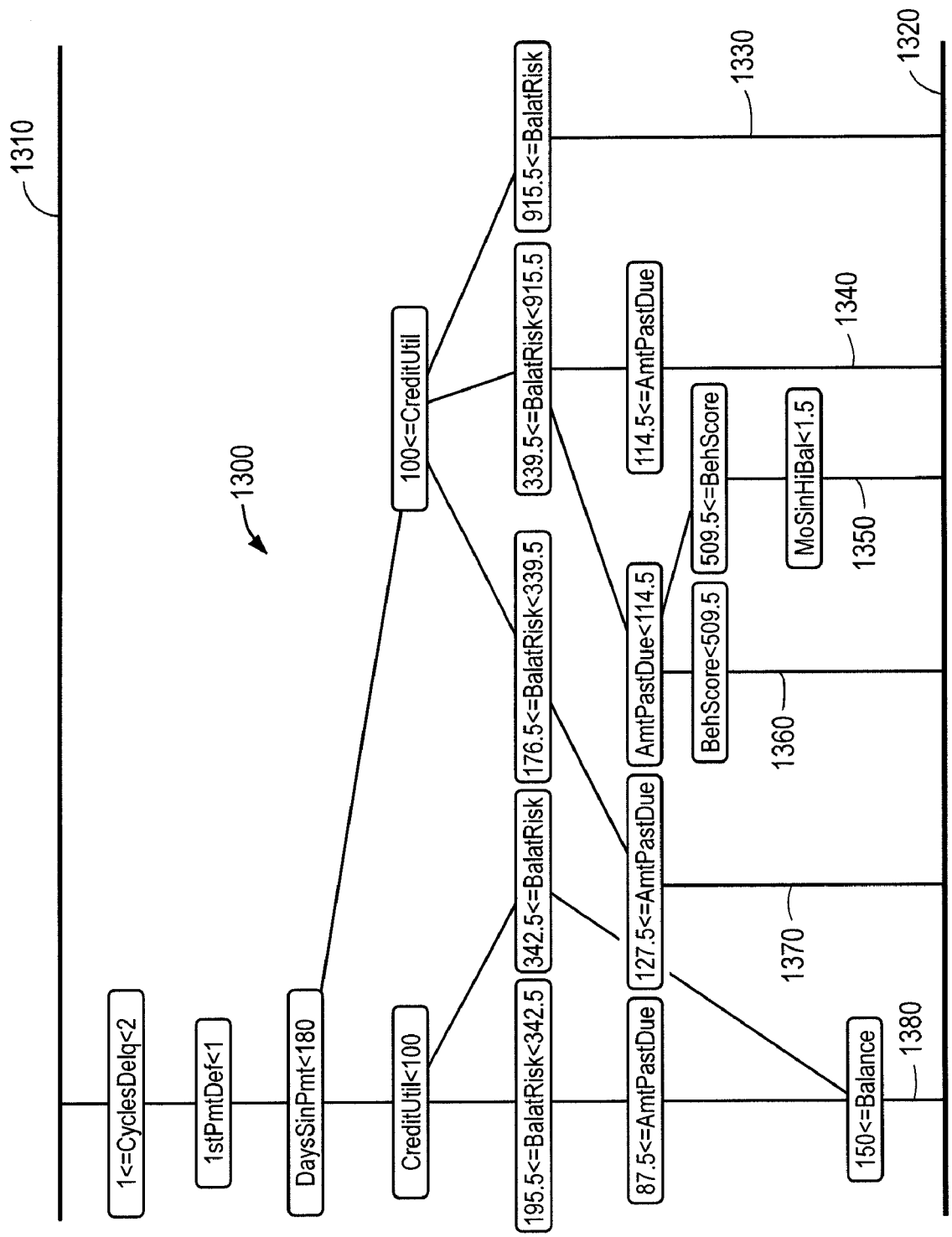
FIG. 13 is a diagram illustrating a fourth action graph depicting the "Ground Line" display.

FIG. 13 illustrates an alternative visual representation of an action graph 1300. This representation can follow an electric circuit analogy, in which the root node and the action node can be replaced by horizontal lines similar to "ground" lines in electric circuits. In this example, a logical path can be represented as a complete connection from one "ground" line 1310 rendered at the top of the graph to another "ground" line 1320 at the bottom of the graph. In this representation, root nodes and action nodes can be removed from the graph. Further, connections from the bottommost node of each logical path 1330, 1340, 1350, 1360, 1370 and 1380 can descend directly down to the ground line, thereby avoiding the diagonal, overlapping lines typically needed for connection to an action node.

Figure 14:
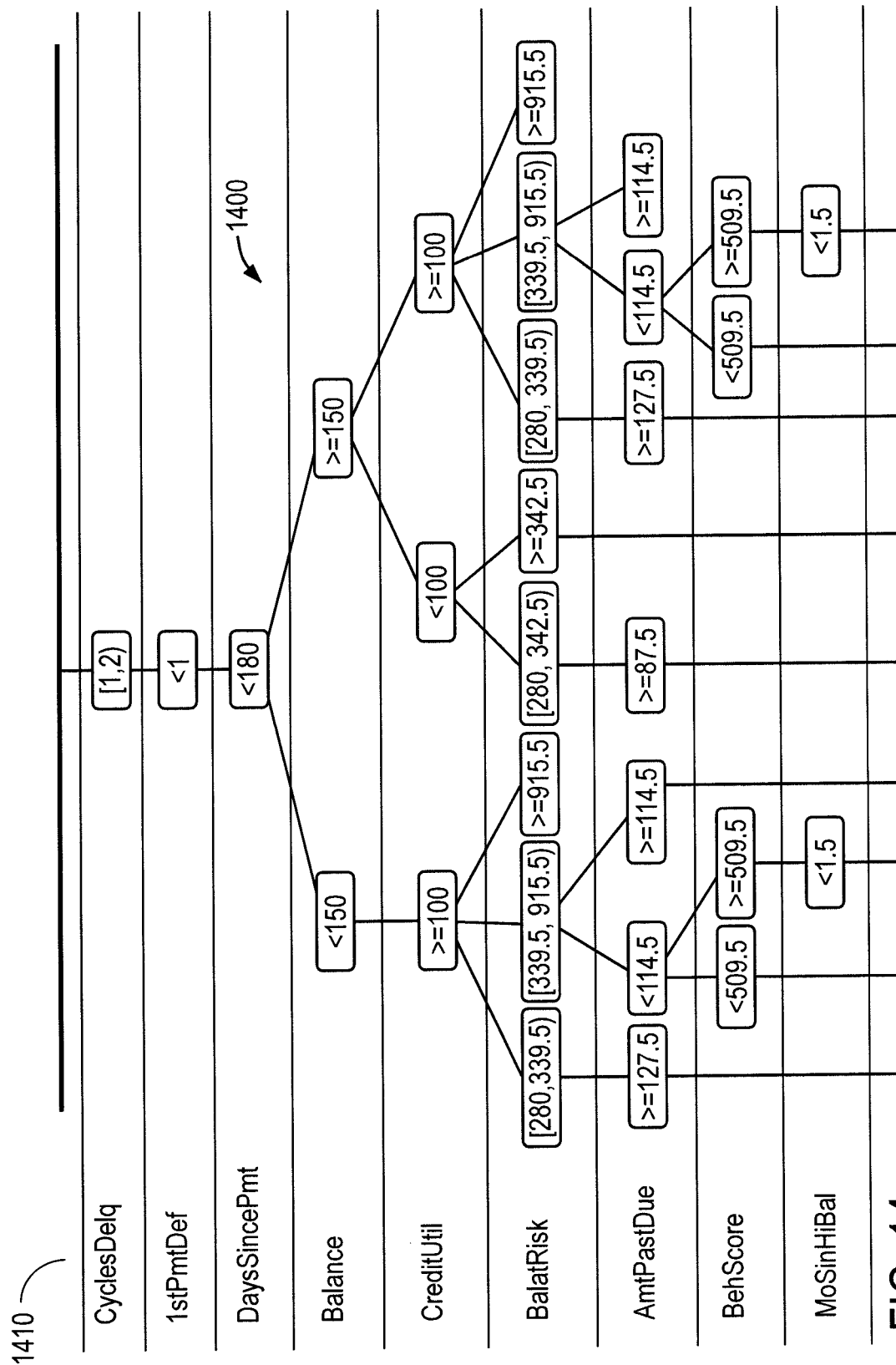
FIG. 14 is a diagram illustrating a visualization that can be used for leveled action graphs.

FIG. 14 is a diagram illustrating another visualization that can be used for the leveled decision tree 1400. This visualization can be referred to as "the zebra display." A leveled decision tree uses the same condition variable at each level of the tree. Because the condition variable for every node in a level is the same, one can use the condition variable to label the whole level rather than each node. As illustrated in FIG. 14, the variables can be displayed in a single column 1410. This allows the nodes to be rendered more compactly by labeling them with just the range of the condition.

The zebra display is a visualization method that, for example, can be used for displaying leveled Decision Trees, DAGs, EDAGs, and action graphs. In a leveled tree or graph, the condition nodes corresponding to a decision on the same variable are lined up in a column or row in the display. In the zebra display, each of these columns or rows is shaded with an alternating background color to make these columns and rows more visually distinct. In addition, this display can reduce the size of labels on all nodes in a column or row by just labeling the column or row itself.

The alternating background colors make the levels much more visually distinct, so it is easier to discern those levels in a complex tree or graph. Second, labeling the level itself instead of the nodes in the level allows those nodes to be rendered with less space. This means that more nodes of the tree or graph can appear on screen at the same time, allowing more of the tree or graph to be understood without the need to scroll or zoom out.

Figure 15:
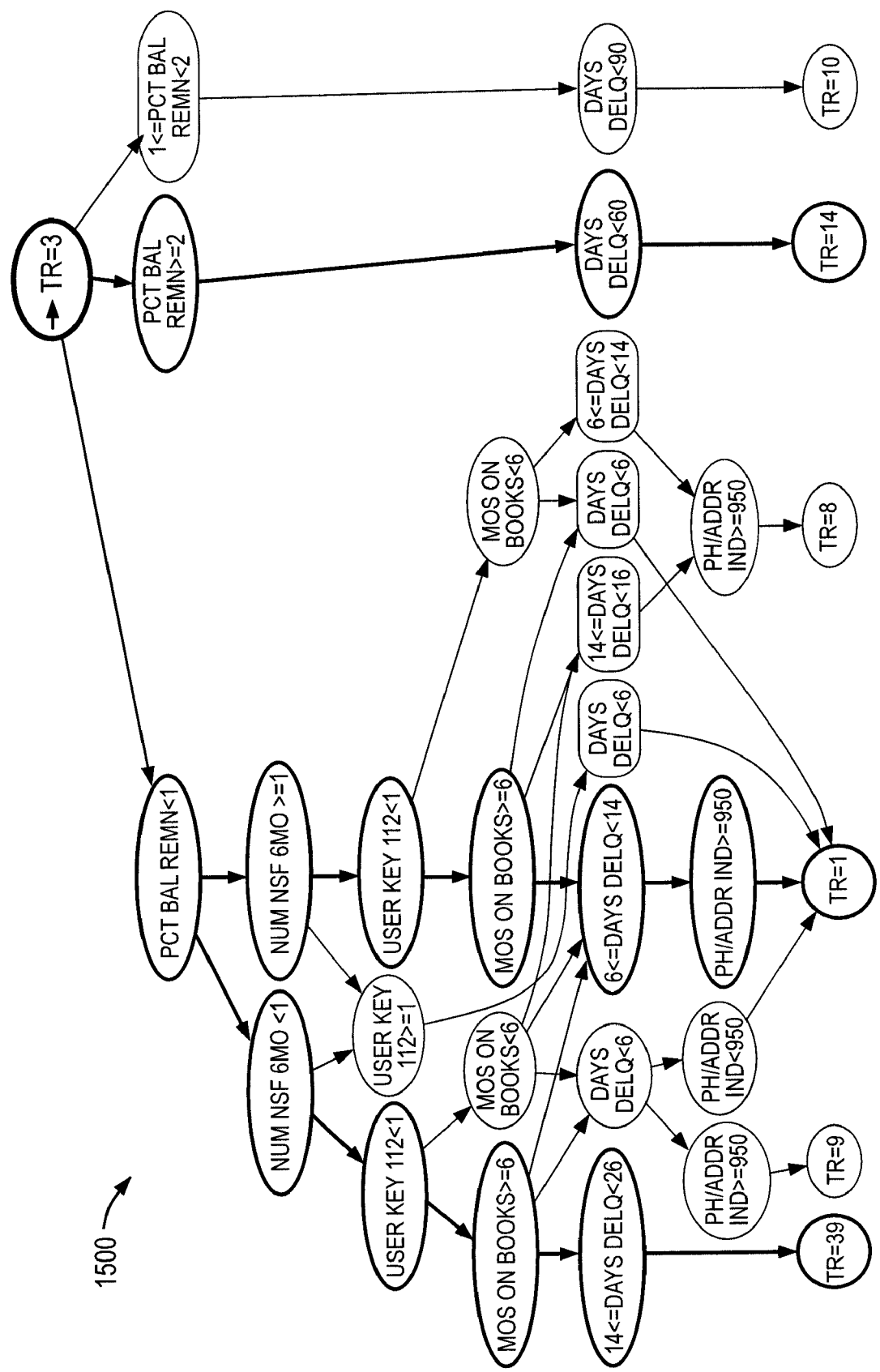
FIG. 15 is a diagram illustrating an EDAG structure with highlighted frequency information.

FIG. 15 illustrates the decision tree 1500 that can be used to visualize frequency information associated with this decision tree. The frequency information can be retrieved from a data store, such as a log file or a database. For example, the frequency information can indicate that one path of the decision tree is leading to a specific action more frequently than any other path. In one variation, only that portion of the tree that leads to a specific action more frequently than any other portion can be visualized.

Any of the visualization techniques described above can be used to visualize the frequency information associated with the decision tree 1500. In addition to these techniques described above, the frequency information can be represented by:
1. Drawing the more frequent (or less frequent) paths in a different color;
2. Drawing the nodes that fall along the more frequent (or less frequent) paths larger than the rest of the nodes;
3. Drawing the connections that fall along the more frequent (or less frequent) paths thicker than the rest of the connections;
4. Drawing the connections that fall along the more frequent (or less frequent) paths shorter and straighter than the rest of the connections.

The visualization approaches all serve to make the paths of interest more visually noticeable and easy to follow than the rest of the paths as shown in FIG. 15. In some variations, one can choose to make the least executed paths be highlighted in this same way. With such an approach, the user could possibly identify those pieces of decision logic that were implemented incorrectly or inefficiently (since they rarely get executed) and, in doing so, possibly make edits so as to make the resulting decision logic more efficient.

Figure 16:
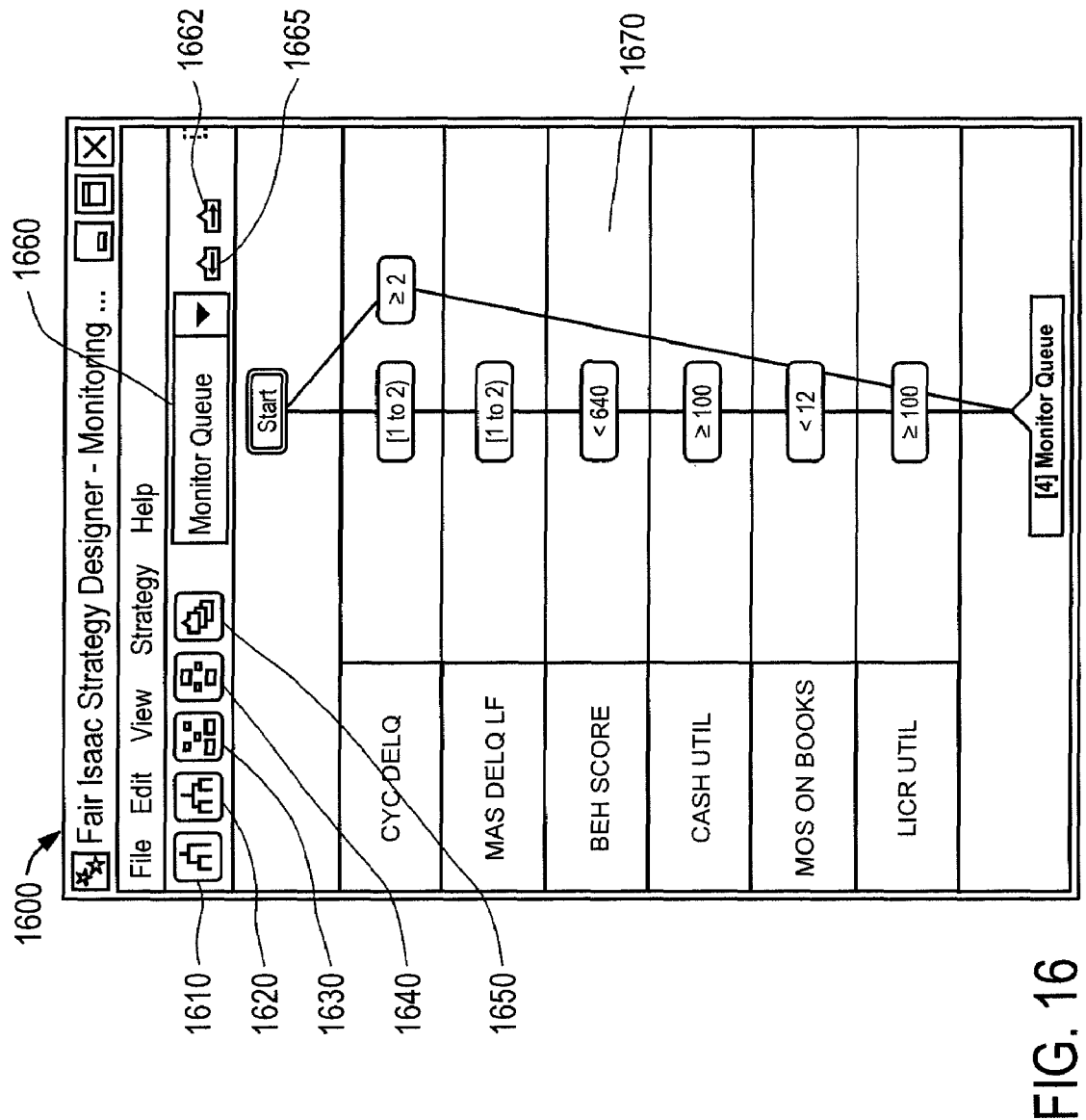
FIG. 16 is a diagram illustrating one example of a user interface that can be used for visualization of the same decision logic in various forms: as an unleveled tree, leveled tree, DAG, EDAG, or as one of the action graphs.

FIG. 16 provides one example of a user interface that can be used for visualization of the same decision logic in alternative forms: as a tree, DAG, EDAG, or set of action graphs. Specifically, FIG. 16 displays the user interface 1600 providing a leveled action graph 1617 using the zebra display. The user interface 1600 also provides a set of buttons allowing the user to switch between various logically equivalent forms of the decision logic representation. For example, the button 1610 can be used to display the decision logic in an unleveled tree form. The button 1620 can be used to display the decision logic in the leveled tree form. The button 1630 can be used to display the decision logic in the DAG form. The button 1640 can be used to display the decision logic in the EDAG form. The button 1650 can be used to display a part of the decision logic in the action graph form.

The user interface 1600 also provides the combo box 1660 that can be used to select an individual action graph for the decision logic. In the user interface 1600, the combo box 1660 is configured to select the "Monitor Queue" action. Accordingly, the action graph 1670 corresponds to the "Monitor Queue" action. The two buttons (1662, 1665) to the right of the combo box 1660 can be used to switch between action graphs in a sequential order.

Figure 17:
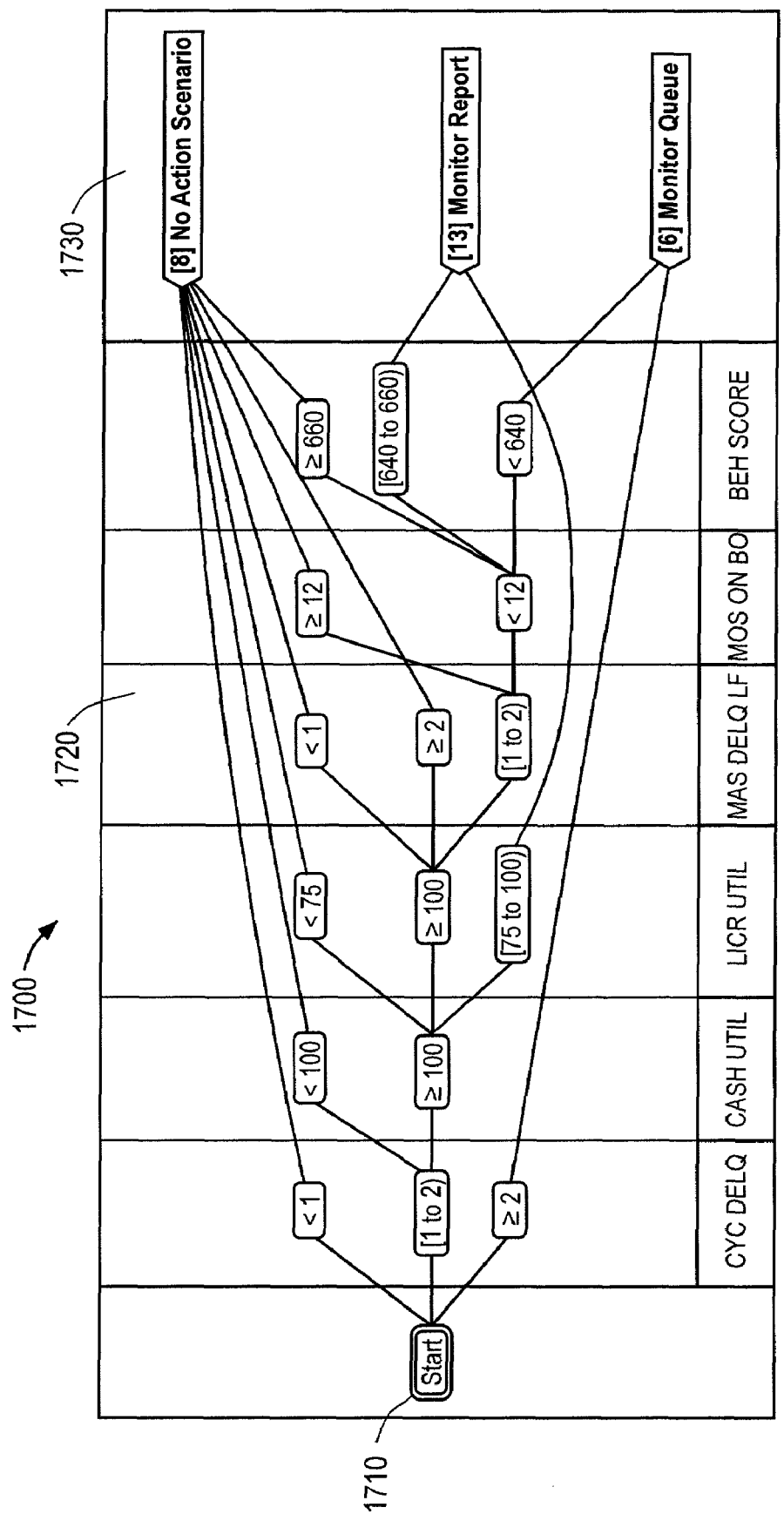
FIG. 17 is a diagram illustrating one example of a zebra interface displaying a leveled DAG structure.

FIG. 17 illustrates one example of a zebra interface displaying the leveled DAG structure 1700. The leveled DAG structure 1700 has the start node 1710, connected through a plurality of intermediary nodes to the three action nodes 1730. The plurality of the intermediary nodes are displayed using the zebra display 1720. The zebra display 1720 simplifies the visualization of the DAG structure 1700 by displaying an identical condition variable at each level of the tree. Because the condition variable in every node of a level is the same, one can use the condition variable to label the whole level rather than each node. As illustrated in FIG. 17, the variables can be displayed in a single row. This allows the nodes to be rendered more compactly by labeling them with just the range of the condition.

Figure 18:
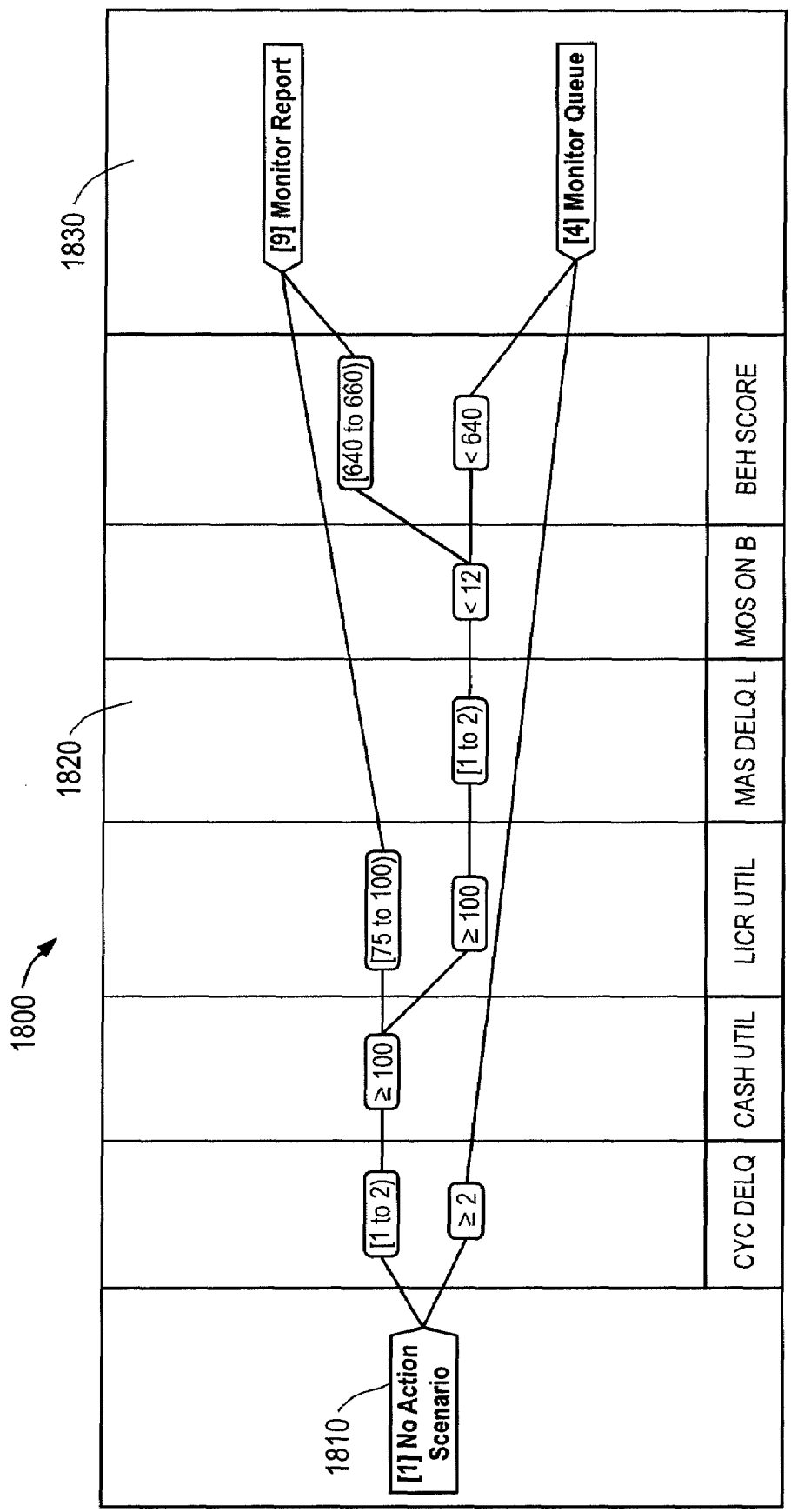
FIG. 18 is a diagram illustrating one example of the zebra interface displaying a leveled EDAG structure.

FIG. 18 is a diagram illustrating one example of the zebra interface displaying the leveled EDAG structure. The leveled EDAG structure 1800 has the start node 1810, connected through a plurality of intermediary nodes to the two action nodes 1730. Similar to the DAG structure on the FIG. 17, the plurality of the intermediary nodes are displayed using the zebra display 1820.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a memory system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable storage medium" refers to any computer program product, apparatus and/or device (e.g., magnetic discs, optical disks, memory, Programmable Logic Devices (PLDs)) used to provide machine instructions and/or data to a programmable processor, including a machine-readable storage medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, modifications are possible. For example, the logic flow depicted in the accompanying figures and described herein does not require the particular order shown, or sequential order, to achieve desirable results. Other embodiments may be within the scope of the following claims.

What is claimed is:

1. A computer implemented method for implementation by one or more data processors comprising:
   providing, by at least one data processor, a control within a graphical user interface to a user, the control comprising a plurality of graphical user interface elements corresponding to linked and unleveled nodes within a hierarchical structure, the hierarchical structure comprising at least one root node on a first end and at least one action node on a second end;
   receiving, by at least one data processor, a user-generated input identifying a selected graphical user interface element within the control;
   identifying, by at least one data processor, a selected node within the hierarchical structure corresponding to the selected graphical user interface element;
   receiving, by at least one data processor, a user-generated request for modifying an appearance of a subset of the linked nodes within the hierarchical structure based on desired visualization criteria, the linked nodes within the hierarchical structure and the selected node, wherein nodes of the hierarchical structure are leveled; and,
   modifying at least one data processor, an appearance of one or more graphical user interface elements corresponding to the received request while continuing to display all of the plurality of graphical user interface elements.

2. The computer implemented method of claim 1, wherein the desired visualization criteria comprise relation criteria and selection criteria.

3. The computer implemented method of claim 2, wherein the relation criteria comprise at least one of the parents, children, ancestors, descendants and siblings.

4. The computer implemented method of claim 2, wherein at least one of the linked nodes within the hierarchical structure corresponds to a condition variable and the relation criteria corresponds to the condition variable.

5. The computer implemented method of claim 2, wherein the selection criteria comprise at least one of the color, fading and visibility.

6. The computer implemented method of claim 2, wherein the selection criteria is based on data from a data set.

7. The computer implemented method of claim 1, wherein each level of the hierarchical structure is displayed by the control using alternating background colors.

8. A computer implemented method for implementation by one or more data processors comprising:
   providing, by at least one data processor, a control within a graphical user interface to a user, the control comprising a plurality of graphical user interface elements corresponding to linked and unleveled nodes within a hierarchical structure, the hierarchical structure comprising at least one root node on a first end and at least one action node on a second end;
   receiving, by at least one data processor, a user-generated input identifying a selected graphical user interface element within the control, such that the selected graphical user interface element corresponds to a selected action node;
   receiving, by at least one data processor, a user-generated input corresponding to a request for generation of an action graph based on the selected action node and a desired visualization criteria;
   generating, by at least one data processor, the action graph based on the selected action node, the linked nodes within the hierarchical structure and the desired visualization criteria, wherein nodes of the action graph are leveled; and,
   displaying, by at least one data processor, the action graph to the user.

9. The computer implemented method of claim 8, wherein the desired visualization criteria comprises:
   replacing the root node with a first line;
   connecting all nodes previously directly connected to the root node to the first line;
   replacing the currently selected node with a second line; and
   connecting all nodes previously directly connected to the currently selected node to the second line.

10. The computer implemented method of claim 9, wherein each level of the action graph is displayed by the control using alternating background colors.

11. The computer implemented method of claim 8, wherein the action graph is optimized.

12. The computer implemented method of claim 11, wherein the optimization is performed by modifying an order of levels.

13. The computer implemented method of claim 12, wherein the order of levels is modified to minimize a number of the linked nodes, while maintaining logical equivalence.

14. An article comprising a non-transitory machine-readable storage medium embodying instructions that when performed by one or more machines result in operations comprising:
   providing a control within a graphical user interface to a user, the control comprising a plurality of graphical user interface elements corresponding to linked and unleveled nodes within a hierarchical structure, the hierarchical structure comprising at least one root node on a first end and at least one action node on a second end;
   receiving a user-generated input identifying a selected graphical user interface element within the control;
   identifying a selected node within the hierarchical structure corresponding to the selected graphical user interface element;
   receiving a user-generated request for modifying an appearance of a subset of the linked nodes within the hierarchical structure based on a desired visualization criteria, the linked nodes within the hierarchical structure and the selected node, the nodes of the hierarchical structure being leveled; and,
   modifying an appearance of one or more graphical user interface elements corresponding to the received request while continuing to display all of the plurality of graphical user interface elements.

15. The article of claim 14, wherein the desired visualization criteria comprise a relation criteria and a selection criteria.

16. The article of claim 15, wherein the relation criteria comprise at least one of the parents, children, ancestors, descendants and siblings.

17. The article of claim 15, wherein at least one of the linked nodes within the hierarchical structure corresponds to a condition variable and the relation criteria corresponds to the condition variable.

18. The article of claim 15, wherein the selection criteria comprise at least one of the color, fading and visibility.

19. The article of claim 15, wherein the selection criteria is based on data from a data set.

20. The article of claim 14, wherein the hierarchical structure is selected from the group consisting of DAG, EDAG, decision tree and action graph.

21. The article of claim 14, wherein the hierarchical structure is leveled.

22. The article of claim 21, wherein each level of the hierarchical structure is displayed by the control using alternating background colors.

23. An article comprising a non-transitory machine-readable storage medium embodying instructions that when performed by one or more machines result in operations comprising:
   providing a control within a graphical user interface to a user, the control comprising a plurality of graphical user interface elements corresponding to linked and unleveled nodes within a hierarchical structure, the hierarchical structure comprising an action graph having at least one root node on a first end and at least one action node on a second end;
   receiving a user-generated input identifying a selected graphical user interface element within the control, such that the selected graphical user interface element corresponds to a selected action node, the selected graphical user interface element being selected based on frequency information, the frequency information being retrieved from a data store and indicating whether paths lead to a specific action more frequently than other paths;
   receiving a user-generated input corresponding to a request for generation of an action graph based on the selected action node and a desired visualization criteria;
   generating the action graph based on the selected action node, the linked nodes within the hierarchical structure and the desired visualization criteria, the nodes of the action graph being leveled; and,
   displaying the action graph to the user.

24. The article of claim 23, wherein the desired visualization criteria comprises:
   replacing the root node with a first line;
   connecting all nodes previously directly connected to the root node to the first line;
   replacing the currently selected node with a second line; and
   connecting all nodes previously directly connected to the currently selected node to the second line.

25. The article of claim 23, wherein the action graph is leveled.

26. The article of claim 25, wherein each level of the action graph is displayed by the control using alternating background colors.

27. The article of claim 23, wherein the action graph is optimized.

28. The article of claim 27, wherein the optimization is performed by modifying an order of levels.

29. The article of claim 28, wherein the order of levels is modified to minimize a number of the linked nodes, while maintaining logical equivalence.

30. An article comprising a non-transitory machine-readable storage medium embodying instructions that when performed by one or more machines result in operations comprising:
   providing a control within a graphical user interface to a user, the control comprising a plurality of graphical user interface elements corresponding to linked and unleveled nodes within a hierarchical structure, the hierarchical structure comprising at least one root node on a first end and at least one action node on a second end;
   receiving a user-generated input identifying a selected graphical user interface element within the control, such that the selected graphical user interface element corresponds to a selected action node;
   receiving a user-generated input corresponding to a request for generation of an action graph based on the selected action node and a desired visualization criteria;
   generating the action graph based on the selected action node, the linked nodes within the hierarchical structure and the desired visualization criteria, wherein nodes of the action graph are leveled; and,
   displaying the action graph to the user.

31. The article of claim 30, wherein the desired visualization criteria comprises:
   replacing the root node with a first line;
   connecting all nodes previously directly connected to the root node to the first line;
   replacing the currently selected node with a second line; and
   connecting all nodes previously directly connected to the currently selected node to the second line.

32. The article of claim 30, wherein each level of the action graph is displayed by the control using alternating background colors.

33. The article of claim 30, wherein the action graph is optimized.

34. The article of claim 32, wherein the optimization is performed by modifying an order of levels.

35. The article of claim 34, wherein the order of levels is modified to minimize a number of the linked nodes, while maintaining logical equivalence.

36. A system comprising:
   one or more data processors; and
   memory storing instructions, which when executed, cause at least one data processor to perform operations comprising:
      providing a control within a graphical user interface to a user, the control comprising a plurality of graphical user interface elements corresponding to linked and unleveled nodes within a hierarchical structure, the hierarchical structure comprising at least one root node on a first end and at least one action node on a second end;
      receiving a user-generated input identifying a selected graphical user interface element within the control, such that the selected graphical user interface element corresponds to a selected action node;
      receiving a user-generated input corresponding to a request for generation of an action graph based on the selected action node and a desired visualization criteria;

generating the action graph based on the selected action node, the linked nodes within the hierarchical structure and the desired visualization criteria, wherein nodes of the action graph are leveled; and, displaying the action graph to the user.

37. An apparatus comprising:

means for providing a control within a graphical user interface to a user, the control comprising a plurality of graphical user interface elements corresponding to linked and unleveled nodes within a hierarchical structure, the hierarchical structure comprising at least one root node on a first end and at least one action node on a second end;

means for receiving a user-generated input identifying a selected graphical user interface element within the control, such that the selected graphical user interface element corresponds to a selected action node;

means for receiving a user-generated input corresponding to a request for generation of an action graph based on the selected action node and a desired visualization criteria;

means for generating the action graph based on the selected action node, the linked nodes within the hierarchical structure and the desired visualization criteria, wherein nodes of the action graph are leveled; and, means for displaying the action graph to the user.

38. A method as in claim 1, wherein the hierarchical structure represents a population divided into at least one subset, at least one population subset is assigned an action, and an action graph is generated for each action represented by the hierarchical structure.

* * * * *